US012536951B2

(12) United States Patent
Sung

(10) Patent No.: US 12,536,951 B2
(45) Date of Patent: Jan. 27, 2026

(54) DISPLAY DEVICE AND ELECTRONIC DEVICE

(71) Applicant: Samsung Display Co., LTD., Yongin-si (KR)

(72) Inventor: Jeongmin Sung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/642,067

(22) Filed: Apr. 22, 2024

(65) Prior Publication Data

US 2025/0014506 A1 Jan. 9, 2025

(30) Foreign Application Priority Data

Jul. 4, 2023 (KR) ........................ 10-2023-0086293

(51) Int. Cl.
*G09G 3/32* (2016.01)
*G09G 3/20* (2006.01)

(52) U.S. Cl.
CPC ............. *G09G 3/32* (2013.01); *G09G 3/2096* (2013.01); *G09G 2300/0819* (2013.01); *G09G 2300/0842* (2013.01); *G09G 2310/06* (2013.01); *G09G 2320/0247* (2013.01);
(Continued)

(58) Field of Classification Search
CPC ............... G09G 3/2092; G09G 3/2096; G09G 3/32–3291; G09G 2300/0819; G09G 2300/0842; G09G 2310/0243; G09G 2310/0267; G09G 2310/06; G09G 2310/08; G09G 2320/0233–0247; G09G 2320/0257; G09G 2320/0266; G09G 2320/10; G09G 2330/021; G09G 2330/023; G09G 2340/0435
See application file for complete search history.

(56) References Cited

U.S. PATENT DOCUMENTS

| | | | | |
|---|---|---|---|---|
| 10,796,632 | B2 | 10/2020 | Sung et al. | |
| 11,551,642 | B2 | 1/2023 | Kim et al. | |
| 2018/0315379 | A1* | 11/2018 | Du ....................... | G09G 3/3406 |

(Continued)

FOREIGN PATENT DOCUMENTS

| | | | |
|---|---|---|---|
| KR | 20220021962 | A | 2/2022 |
| KR | 102370340 | B1 | 3/2022 |

(Continued)

*Primary Examiner* — Nathan Danielsen
(74) *Attorney, Agent, or Firm* — CANTOR COLBURN LLP

(57) ABSTRACT

A display device includes a display panel and a display driver circuit. The display driver circuit includes a driving controller configured to receive an image signal at a variable frame rate, and output image data obtained through by converting of the image signal in response to a synchronization signal. The driving controller includes a light emitting control block. The light emitting control block compares a reference period of a reference cycle section of a light emitting cycle of the display panel, which is preset, with a display period of the present frame section, changes the reference period to an adjusted period depending on a comparison result, and outputs a driving control signal for controlling the display panel to emit light during an adjusted cycle section in which the display panel has the adjusted period from a starting time point of a next frame section.

20 Claims, 16 Drawing Sheets

(52) U.S. Cl.
CPC ............... *G09G 2320/0257* (2013.01); *G09G 2330/023* (2013.01); *G09G 2340/0435* (2013.01)

(56) References Cited

U.S. PATENT DOCUMENTS

| | | | | |
|---|---|---|---|---|
| 2021/0142742 | A1* | 5/2021 | Ishii | G09G 3/3233 |
| 2021/0201793 | A1* | 7/2021 | Lin | G09G 3/3233 |
| 2021/0398508 | A1* | 12/2021 | Lee | G09G 5/363 |
| 2022/0051631 | A1 | 2/2022 | Cheon et al. | |

FOREIGN PATENT DOCUMENTS

| | | | |
|---|---|---|---|
| KR | 20220081161 | A | 6/2022 |
| KR | 102503025 | B1 | 2/2023 |

* cited by examiner

DISPLAY DEVICE AND ELECTRONIC DEVICE

This application claims priority to Korean Patent Application No. 10-2023-0086293, filed on Jul. 4, 2023, and all the benefits accruing therefrom under 35 U.S.C. § 119, the content of which in its entirety is herein incorporated by reference.

BACKGROUND

1. Field

The present invention relates to a display device and an electronic device, and more particularly, to a display device and an electronic device, capable of improving image quality.

2. Description of Related Art

An emissive display device displays an image by using a light emitting diode that generates light through the recombination of electrons and holes. The emissive display device has a rapid response speed and is driven with lower power consumption.

The emissive display device includes pixels connected to data lines and scan lines. The pixels typically include a light emitting diode and a circuit unit to control the quantity of current flowing through the light emitting diodes. The circuit unit controls the quantity of current, in response to a data signal, such that the current passes through the light emitting diode at a first driving voltage and flows at a second driving voltage. In this case, light having specific brightness is generated to correspond to the quantity of current flowing through the light emitting diode.

SUMMARY

Embodiments of the invention provide a display device and an electronic device, wherein the display device is capable of improving image quality when operating in a variable frequency mode.

According to an embodiment, a display device includes a display panel including a plurality of pixels which emit light in response to a data signal, and a display driver circuit configured to provide the data signal to the display panel.

In an embodiment, the display driver circuit includes a driving controller configured to receive an image signal at a variable frame rate and output image data obtained by converting the image signal in response to a display synchronization signal, and a data driver configured to convert the image data to the data signal and output the data signal.

In an embodiment, the driving controller includes a data converting block and a light emitting control block. The data converting block converts the image signal to the image data and outputs the image data for a present frame section determined based on the display synchronization signal. The light emitting control block compares a reference period of a reference cycle section of a light emitting cycle of the display panel, which is preset, with a display period of the present frame section, changes the reference period to an adjusted period depending on a comparison result, and outputs a driving control signal for controlling the display panel to emit light during an adjusted cycle section in which the display panel has the adjusted period from a starting time point of a next frame section.

According to an embodiment, a display device includes a display panel including a plurality of pixels which emit light in response to a data signal, and a display driver circuit configured to provide the data signal to the display panel.

In an embodiment, the display driver circuit includes a driving controller configured to receive an image signal at a variable frame rate and output image data obtained by converting the image signal in response to a display synchronization signal, and a data driver configured to convert the image data to the data signal and output the data signal.

In an embodiment, the driving controller includes a data converting block and a light emitting control block. The data converting block converts the image signal to the image data, and outputs the image data during a present frame section determined based on the display synchronization signal. The light emitting control block compares a reference period of a reference cycle section of a light emitting cycle of the display panel, which is preset, with a display period of the present frame section, and holds the light emitting cycle in a specific state from a next frame section, when the display period differs to an integer multiple of the reference period.

According to an embodiment, an electronic device includes a display panel including a plurality of pixels which emit light in response to a data signal, a display driver circuit configured to provide the data signal to the display panel, and a main processor configured to provide an image signal to the display driving circuit in response to an input synchronization signal.

In an embodiment, the display driver circuit includes a driving controller configured to receive the image signal from the main processor at a variable frame rate, and output image data obtained by converting the image signal in response to a display synchronization signal, and a data driver configured to convert the image data to the data signal and output the data signal, In an embodiment, the driving controller includes a data converting block and a light emitting control block. The data converting block converts the image signal to the image data to output the image data during a present frame section determined based on the display synchronization signal. The light emitting control block compares a reference period of a reference cycle section of a light emitting cycle of the display panel, which is preset, with a display period of the present frame section, changes the reference period to an adjusted period depending on a comparison result, and outputs a driving control signal for controlling the display panel to emit light during an adjusted cycle section having the adjusted period from a starting time point of a next frame section.

BRIEF DESCRIPTION OF THE FIGURES

The above and other objects and features of the invention will become apparent by describing in detail embodiments thereof with reference to the accompanying drawings.

DETAILED DESCRIPTION

Figure 1:
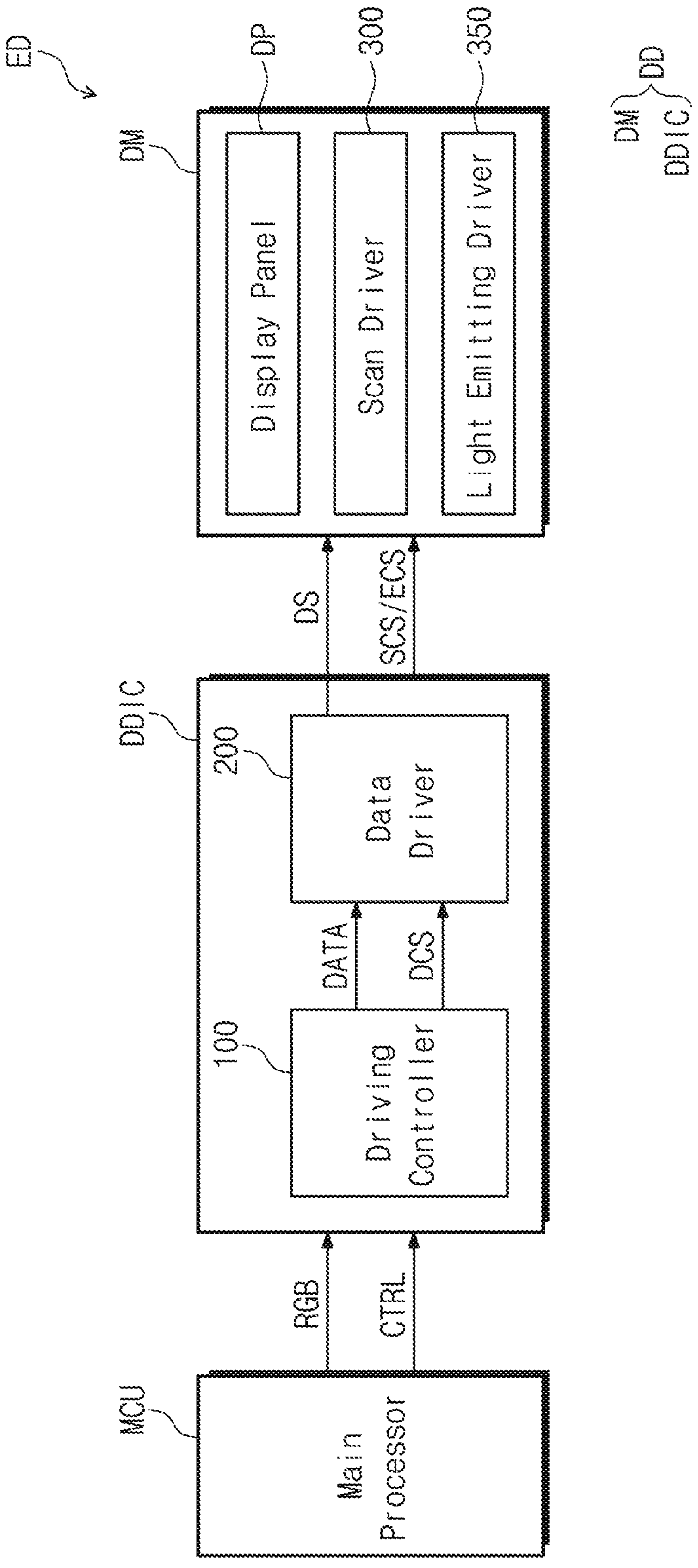
FIG. 1 is a block diagram of an electronic device, according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numeral will be assigned to the same component. In addition, in drawings, thicknesses, proportions, and dimensions of components may be exaggerated to describe the technical features effectively. The term "and/or" includes any and all combinations of one or more of associated components.

Although the terms "first", "second", etc. may be used to describe various components, the components should not be construed as being limited by the terms. The terms are only used to distinguish one component from another component. For example, without departing from the scope and spirit of the invention, a first component may be referred to as a second component, and similarly, the second component may be referred to as the first component. The singular forms are intended to include the plural forms unless the context clearly indicates otherwise.

In addition, the terms "under", "at a lower portion", "on", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the invention belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the invention will be described with reference to accompanying drawings.

FIG. 1 is a block diagram of a display device, according to an embodiment.

In an embodiment and referring to FIG. 1, an electronic device ED may be a device to output various pieces of information through a display module DM in an operating system (OS). For example, the electronic device ED may be an electronic device, such as a smartphone, a smart watch, a tablet PC, a laptop computer, a computer, a smart television (TV), or a navigation device.

In an embodiment, the electronic device ED may communicate with an external electronic device through a network (e.g., a short-range wireless communication network, or a long-distance wireless communication network). According to an embodiment, the electronic device ED may include a main processor MCU, a display driver circuit DDIC, and the display module DM.

In an embodiment, the main processor MCU may include at least one of a central processing unit (CPU) or an application processor (AP). The main processor MCU may further include at least one of a graphic processing unit (GPU), a communication processor (CP), or an image signal processor (ISP).

In an embodiment, the display driver circuit DDIC (or a display driving chip) may include a driving controller 100 (or a driving control circuit) and a data driver 200 (or a data driving circuit). The driving controller 100 receives an image signal RGB and a control signal CTRL from the main processor MCU. The driving controller 100 generates image data DATA by converting a data format of the image signal RGB to be matched to the interface specification of the data driver 200. The driving controller 100 may output various driving control signals (e.g., first to third driving control signals DCS, SCS, or ECS, respectively) necessary for the driving of the display module DM, in response to the control signal CTRL.

In an embodiment, the data driver 200 receives the image data DATA and the first driving control signal DCS from the driving controller 100. The data driver 200 may compensate the image data DATA to display an image having a desired brightness depending on the characteristic of the electronic device ED or user settings or may convert the image data DATA to reduce power consumption or compensate for an after image.

Figure 7:
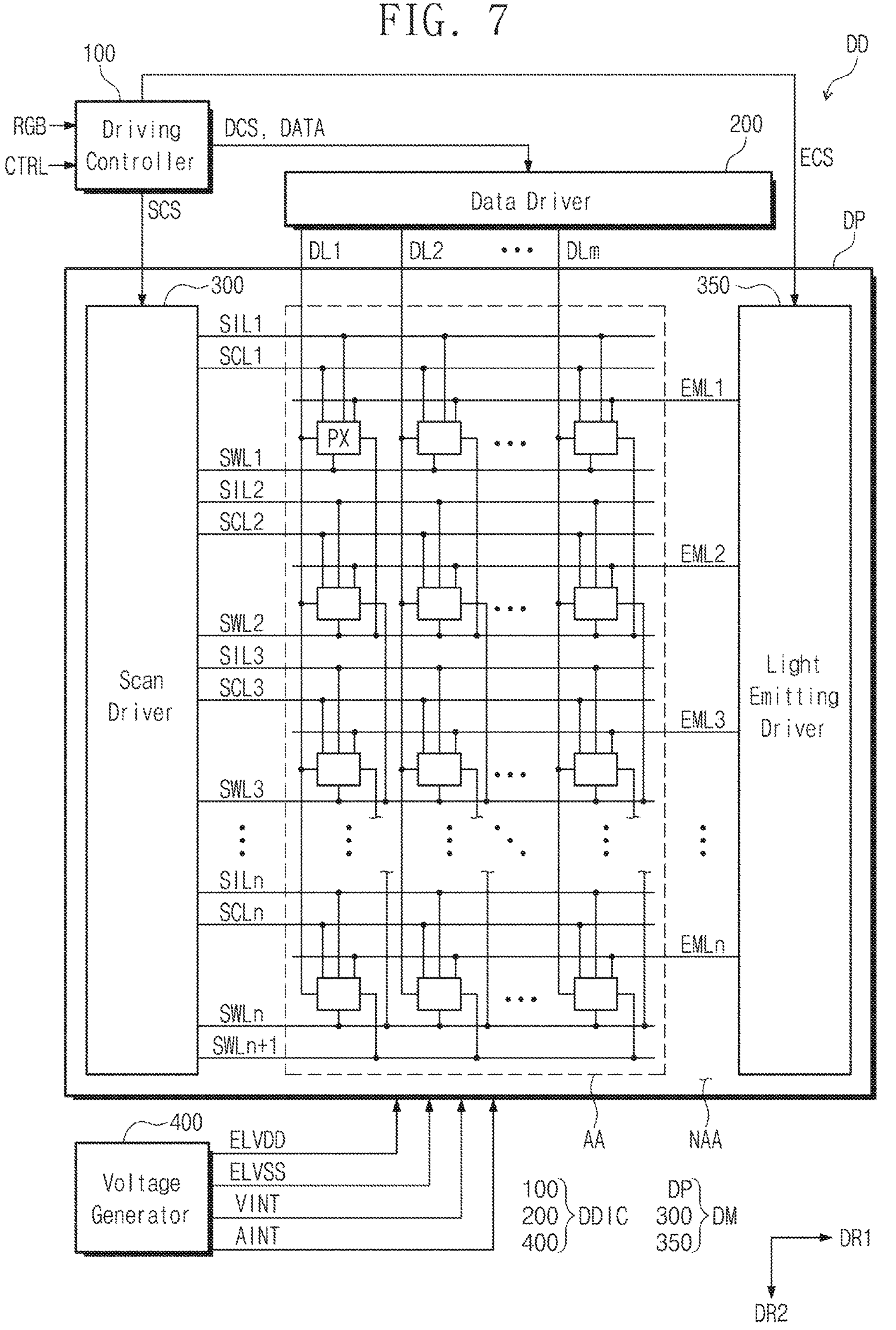
FIG. 7 is a schematic block diagram of a display device, according to an embodiment.

In an embodiment, the display driver circuit DDIC may further include a voltage generator 400 (or a voltage generating circuit) (see FIG. 7). The voltage generator 400 may output various types of voltages (e.g., first and second driving voltages ELVDD and ELVSS (see FIG. 7)) necessary for the driving of a display panel DP.

In an embodiment, the display module DM visually provides information to a user. The display module DM may include the display panel DP, a scan driver 300 (or a scan driving circuit), and a light emitting driver 350 (or a light emitting deriving circuit).

In an embodiment, the display panel DP may be a light emitting display panel, but the invention is not particularly limited thereto. For example, the display panel DP may include an organic light emitting display panel, an inorganic light emitting display panel, or a quantum-dot light emitting display panel. A light emitting layer of the organic light emitting display panel may include an organic light emitting material, and a light emitting layer of the inorganic light emitting display panel may include an inorganic light emitting material. A light emitting layer of the quantum dot light emitting display panel may include a quantum dot and a quantum rod. Hereinafter, the following description will be made based on the embodiment that the display panel DP is the organic light emitting display panel. The display panel DP may include a plurality of pixels PX (see FIG. 7), a plurality of scan lines, a plurality of data lines, a plurality of light emitting control lines, and a plurality of voltage lines. Each of the pixels PX may include a light emitting element ED (see FIG. 8) and a pixel circuit part PXC (see FIG. 8) connected to the light emitting element ED.

In an embodiment, the scan driver 300 receives the second driving control signal SCS from the driving controller 100. The scan driver 300 may output scan signals to scan lines, in response to the second driving control signal SCS.

In an embodiment, the light emitting driver 350 receives the third driving control signal ECS from the driving controller 100. The light emitting driver 350 may output light emitting control signals to light emitting control lines, in response to the third driving control signal ECS. In another embodiment, the scan driver 300 may be connected to the light emitting control lines. In this case, the light emitting driver 350 may be omitted, and the scan driver 300 may output the light emitting control signals to the light emitting control lines.

In an embodiment, the display module DM may further include a window, a chassis, and a bracket to protect the display panel DP. In addition, the electronic device ED may further include at least some components in addition to the above-described components.

Figure 2:
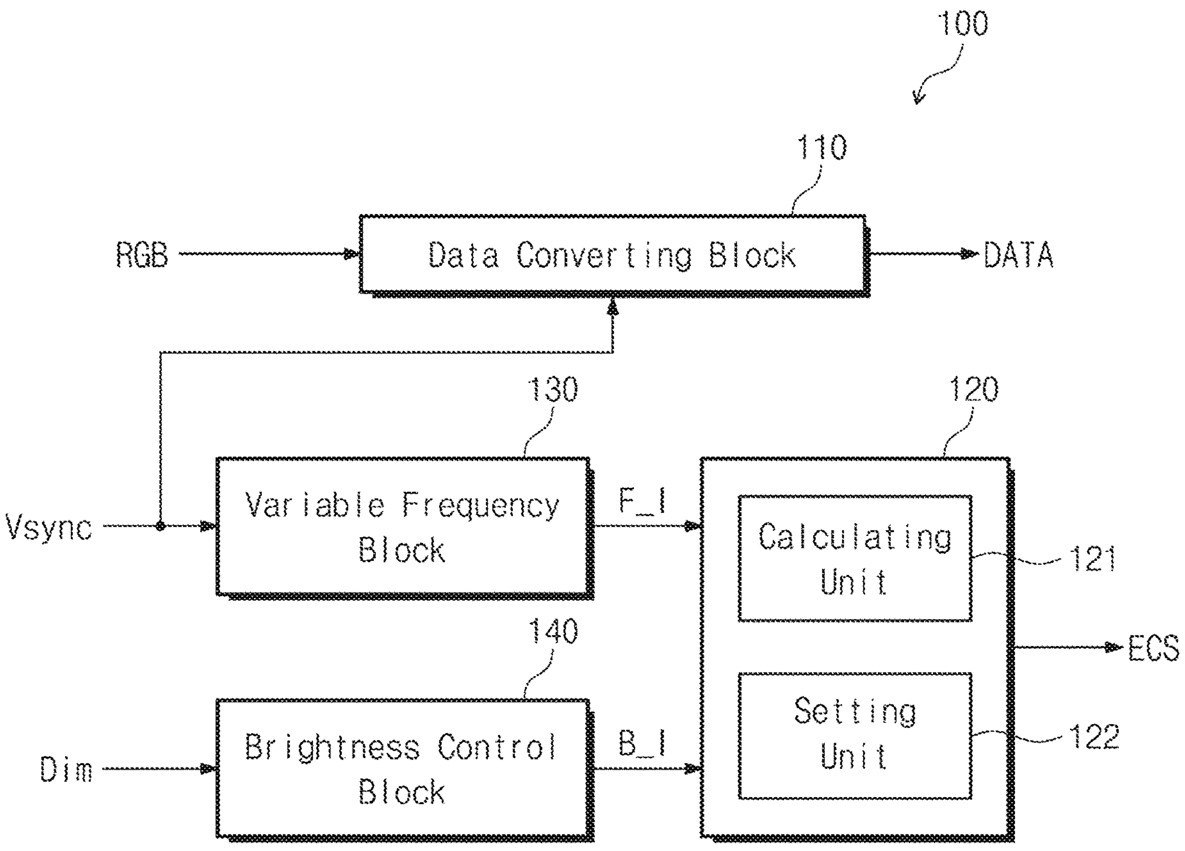
FIG. 2 is a block diagram of a driving controller, according to an embodiment.

FIG. 2 is a block diagram of a driving controller, according to an embodiment.

In an embodiment and referring to FIGS. 1 and 2, the driving controller 100 may support a variable frequency mode. In the variable frequency mode, the main processor MCU provides the image signal RGB to the driving controller 100 at a variable frame rate. The driving controller 100, which supports the variable frequency mode, controls the driving of the data driver 200 and the display module DM in synchronization with the variable frame rate, such that the electronic device ED displays the image at the variable frame rate. According to an embodiment, the highest frame rate of variable frame rates supported in the variable frequency mode may be referred to as a reference frame rate.

In an embodiment, the period in which the driving controller 100 outputs image data DATA to the data driver 200 may be defined as a frame section. In the variable frequency mode, the duration of the frame section may be varied depending on the frame rate. For example, when the frame rate is about 240 Hz, a duration of the frame section may be approximately 4.167 ms, and when the frame rate is about 60 Hz, the duration of the frame section may be approximately 16.7 ms. According to an embodiment, the reference frame rate may be set to about 480 Hz, about 360 Hz, or about 240 Hz.

In an embodiment, during a present frame section, the driving controller 100 may receive the image signal RGB at a present frame rate. The present frame rate may be less than or equal to the reference frame rate.

In an embodiment, the driving controller 100 includes a data converting block 110 and a light emitting control block 120. The data converting block 110 may convert the image signal RGB to the image data DATA, and output the image data DATA during the frame section determined based on a display synchronization signal Vsync (see FIG. 3A). The image data DATA output from the data converting block 110 may be provided to the data driver 200.

In an embodiment, the light emitting control block 120 may output a light emitting driving control signal (i.e., the third driving control signal ECS), which controls a light emitting period of the display panel DP, of various driving control signals. The light emitting control block 120 may compare a reference period of a reference cycle section of a preset light emitting cycle (AID cycle) (see FIG. 3A) with a display period of the present frame section and may change the reference period to an adjustment period, based on the comparison result. The light emitting control block 120 may control the display panel DP to emit light, during an adjusted cycle section, in which the display panel DP has the adjustment period, from a starting time point of a next frame section.

In an embodiment, the light emitting control block 120 may include a calculating unit 121 and a setting unit 122. The calculating unit 121 may compare the display period with the integer multiple of the reference period and may calculate the difference between the display period and the integer multiple of the reference period, when the display period is different from the integer multiple of the reference period based on the comparison result. The setting unit 122 may set the adjustment period and a duty ratio of the adjusted cycle section based on the calculated difference and may output the third driving control signal ECS corresponding to the adjustment period and the duty ratio.

In an embodiment, the third driving control signal ECS may be provided to the light emitting driver 350 of the display module DM, and the light emitting driver 350 may control the light emitting cycle AID cycle of the display panel DP, in response to the third driving control signal ECS.

In another embodiment, the light emitting control block 120 may hold the light emitting cycle AID cycle to be in a specific state (active state or inactive state), from a next frame section, when the display period is different from the integer multiple of the reference period based on the comparison result.

In an embodiment, the driving controller 100 may further include a variable frequency block 130 and a brightness control block 140. The variable frequency block 130 may calculate the display period of the present frame section based on the variable frame rate, and may provide information F_I (hereinafter, period information) on the calculated display period to the calculating unit 121 of the light emitting control block 120. Accordingly, the calculating unit 121 may compare the display period and the reference period, based on the period information F_I provided from the variable frequency block 130.

In an embodiment, the brightness control block 140 may set the reference duty ratio of the reference cycle section based on a dimming signal Dim. The brightness control block 140 may provide the information B_I (hereinafter, duty information) on the set reference duty ratio to the setting unit 122 of the light emitting control block 120. Accordingly, the setting unit 122 may generate the third driving control signal ECS for controlling the adjusted cycle section to have an adjusted duty ratio different from the reference duty ratio of the reference cycle section, based on the duty information B_I provided from the brightness control block 140.

Figure 3A:
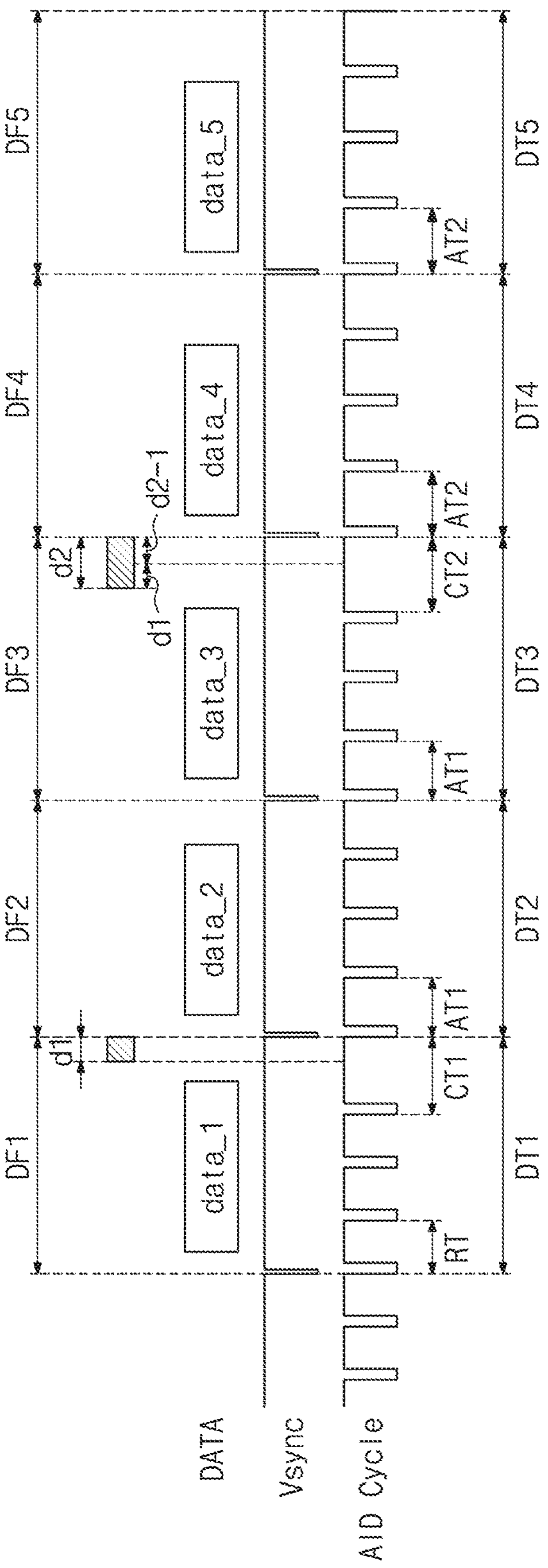
FIG. 3A is a timing diagram illustrating the operation of a display device, according to an embodiment.
Figure 3B:
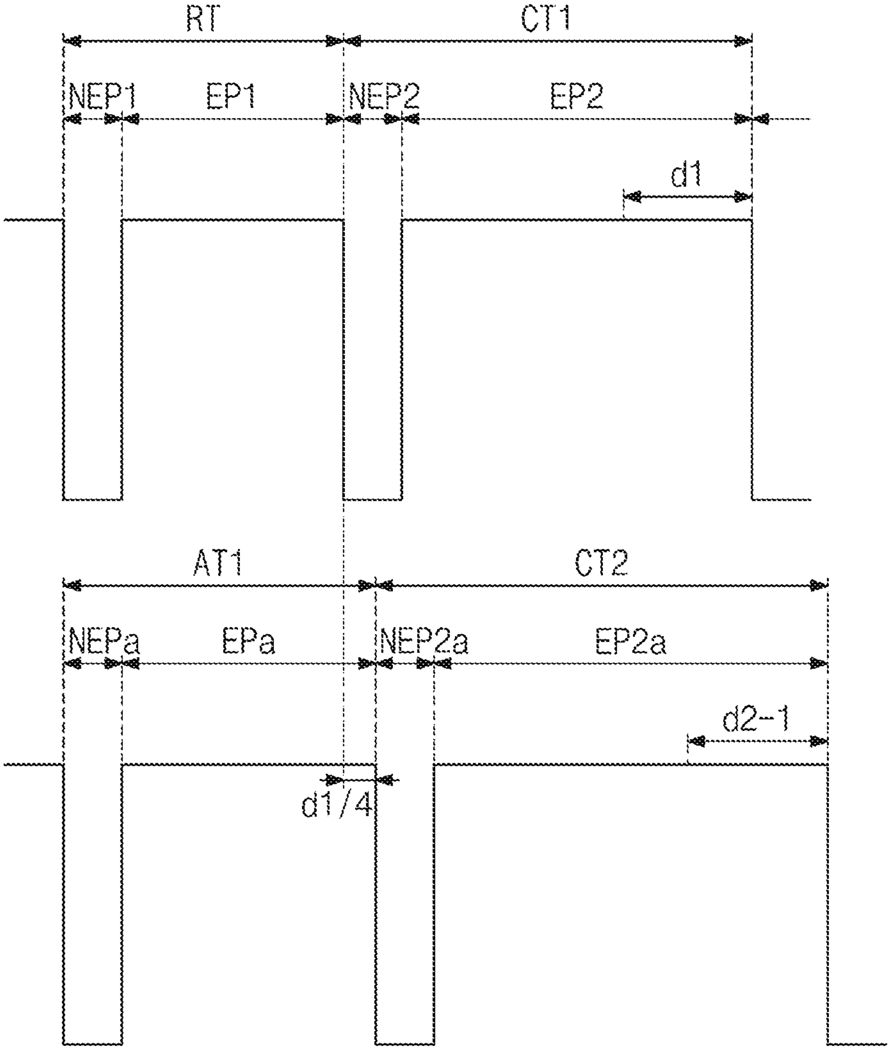
FIG. 3B is a timing diagram illustrating the operation of a display device, according to an embodiment.
Figure 4A:
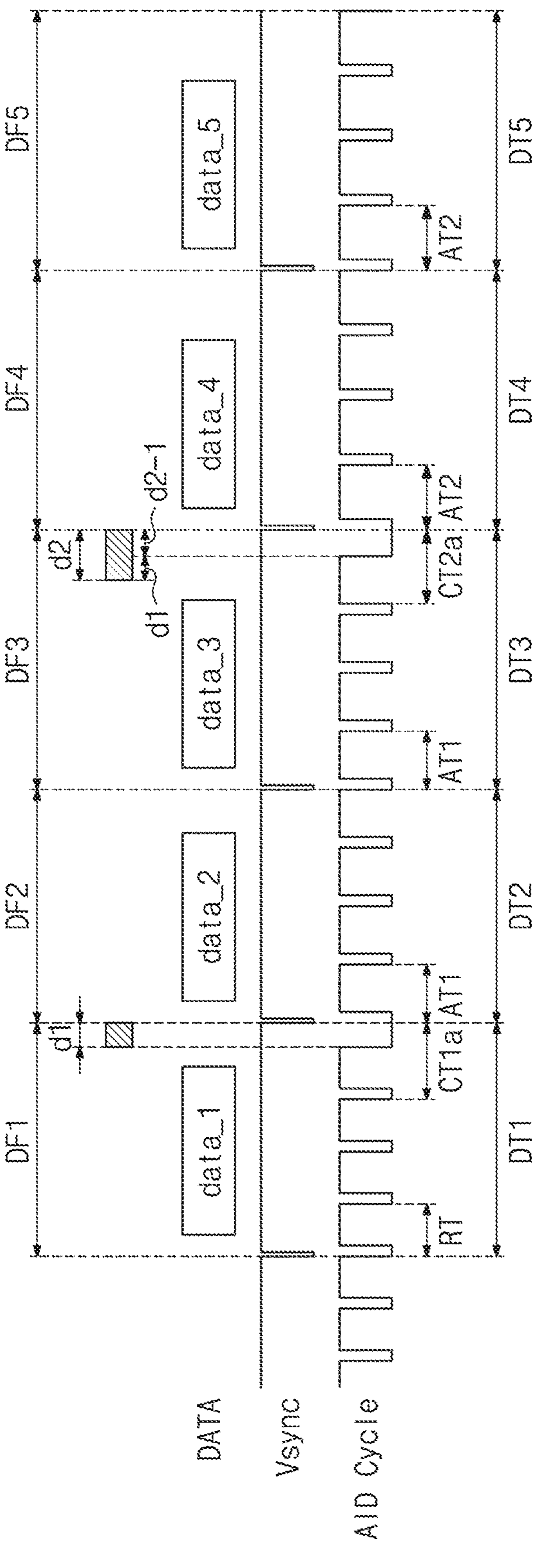
FIG. 4A is a timing diagram illustrating the operation of a display device, according to an embodiment.
Figure 4B:
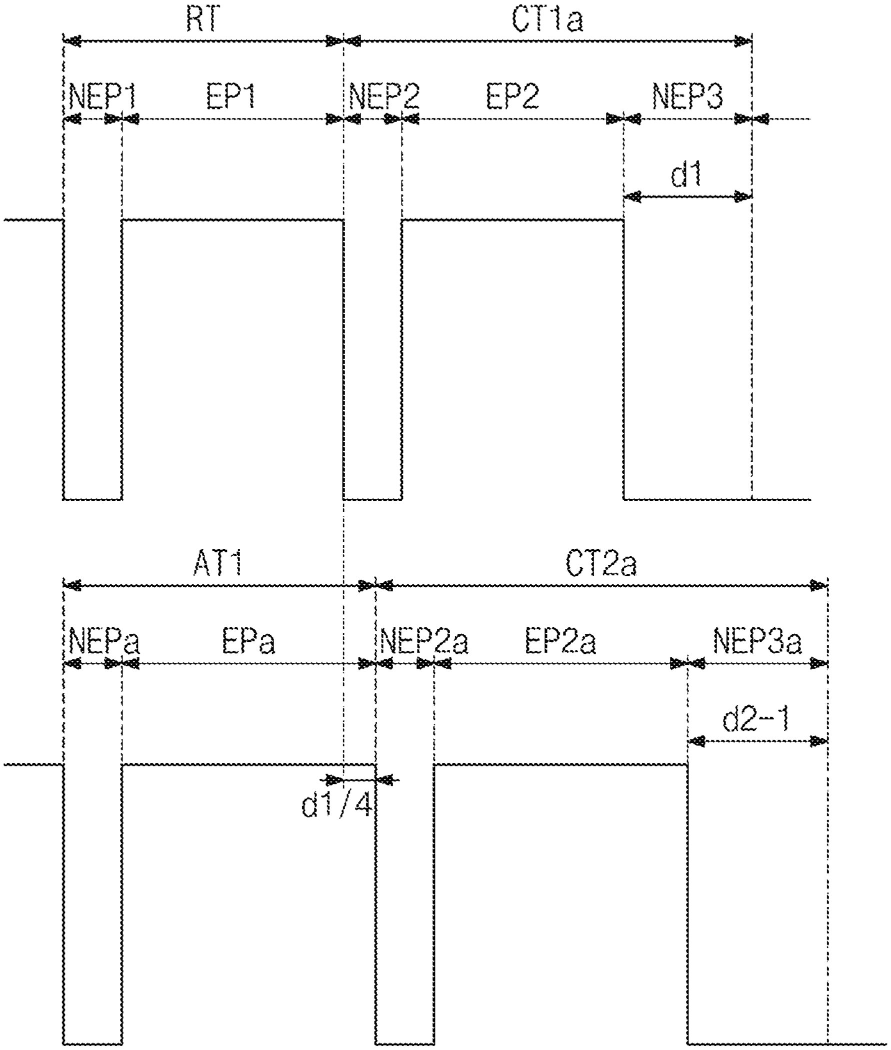
FIG. 4B is a timing diagram illustrating the operation of a display device, according to an embodiment.
Figure 5:
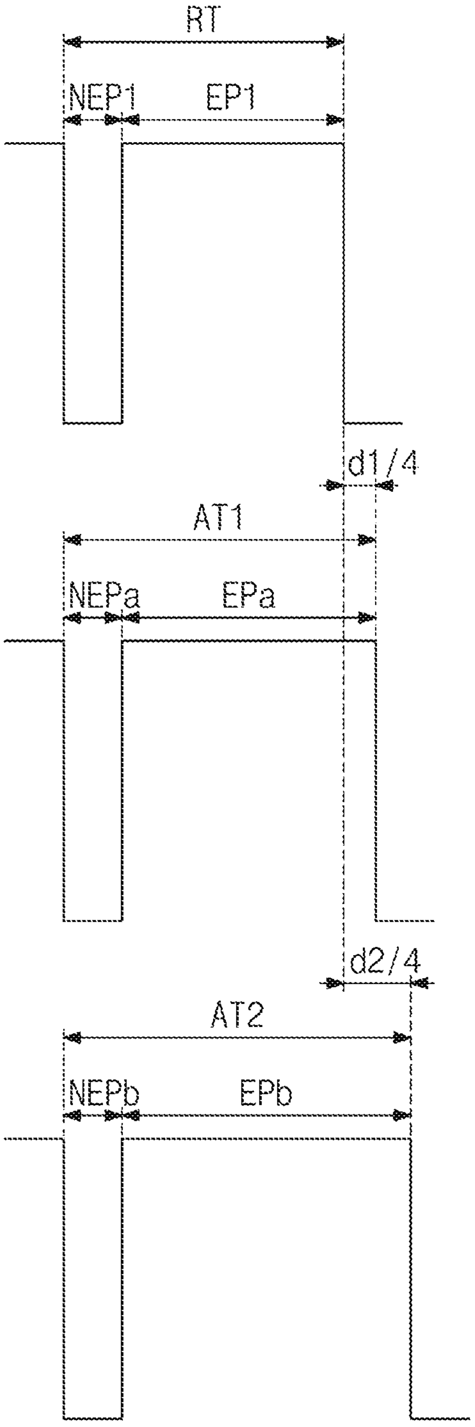
FIG. 5 is a timing waveform which describes a reference duty ratio and first and second adjusted duty ratios, according to an embodiment.

FIGS. 3A and 3B are timing diagrams to describe the operation of a display device, according to an embodiment. FIGS. 4A and 4B are timing diagrams to describe the operation of a display device, according to an embodiment. FIG. 5 is a timing diagram to describe a reference duty ratio and first and second adjusted duty ratios, according to an embodiment.

In an embodiment and referring to FIGS. 3A and 4A, the electronic device ED may operate in the variable frequency mode in which the frame rate is varied. FIG. 3A illustrates first to fifth frame sections DF1, DF2, DF3, DF4, and DF5, respectively. For example, the electronic device ED operates at a first frame rate for the first and second frame sections DF1 and DF2, respectively, operates at a second frame rate for the third and fourth frame sections DF3 and DF4, respectively, and operates at a third frame rate for the fifth frame section DF5.

According to an embodiment, the first frame rate may be less than or equal to the highest reference frame rate at which the electronic device ED may operate. For example, the reference frame rate may be about 240 Hz, about 360 Hz, or about 480 Hz. The second and third frame rates may be less than the first frame rate. The second and third frame rates may be different from each other.

In an embodiment and as described above, when the first to third frame rates are different from each other, the periods (hereinafter, display periods DT1 and DT2) of the first frame section DF1 and the second frame section DF2, respectively, may be different from display periods DT3 and DT4 of the third frame section DF3 and the fourth frame section DF4, respectively. In addition, a display period DT5 of the fifth frame section DF5 may be different from the display periods DT1 to DT4 of the first frame section DF1, second frame section DF2, third frame section DF3 and fourth frame section DF4, respectively. For example, each of the first to fifth frame sections DF1 to DF5, respectively, may include a display section and a blank section. A duration of the blank section may be varied depending on the operating frequency, and a duration of the display period may be constant instead of being varied depending on the driving frequency. In this case, the display section may be a section in which the driving controller 100 actually provides the image data DATA (see FIG. 1) to the data driver 200.

In an embodiment, the image data DATA provided to the data driver 200 for the first to fifth frame sections DF1 to DF5, respectively, may be referred to as first image data data_1, second image data data_2, third image data date_3, fourth image data data_4 and fifth image data data_5, respectively.

In an embodiment, the display periods DT1 to DT5 of the first to first frame section DF1, second frame section DF2, third frame section DF3, fourth frame section DF4 and fifth frame section DF5, respectively, may be determined by a display synchronization signal Vsync (or a vertical synchronization signal). For example, each of the display periods DT1 to DT5 may be defined from a present falling edge time point of the display synchronization signal Vsync to a next falling edge time point of the display synchronization signal Vsync. In the variable frequency mode, the period of the display synchronization signal Vsync may be varied depending on the frame rate. The display synchronization signal Vsync may be a signal included in the first driving control signal DCS provided to the data driver 200 by the driving controller 100.

In an embodiment, the display panel DP (see FIG. 1) may emit light at the light emitting cycle AID cycle which is preset. The reference cycle section of the light emitting cycle AID cycle has a reference period RT. The integer multiple of the reference period RT may be set to be equal to the display period (i.e., the reference display period) of the frame section having the reference frame rate. For example, the reference display period may be set to one time or twice of the reference period RT.

In an embodiment, the light emitting control block 120 may compare the display periods DT1 to DT5 with the reference period RT at every frame section. The light emitting control block 120 may calculate the difference between the integer multiple of the reference period RT with each of the display periods DT1 to DT5, when each of the display periods DT1 to DT5 differs from the integer multiple of the reference period RT. For example, the light emitting control block 120 may calculate the difference (i.e., a first difference d1) between the first display period DT1 with the integer multiple (e.g., 4×RT) of the reference period RT, when the first display period DT1 is different from the integer multiple (4×RT) of the reference period RT during the first frame section DF1.

In an embodiment, the first frame section DF1 may correspond to 'k' number of reference cycle sections and one compensating cycle section. In this case, 'k' may be an integer equal to or greater than '1', and FIG. 3A illustrates that 'k' is '3'. The period (i.e., a first compensating period CT1) of the compensating cycle section may be greater than the period (i.e., the reference period RT) of the reference cycle section by the first difference 'd1'. A duty ratio of the compensating cycle section may be different from a duty ratio of each of the 'k' number of reference cycle sections. The compensating cycle section may follow the 'k' number of reference cycle sections.

In an embodiment and as illustrated in FIG. 3B, each reference cycle section includes a first non-light emitting section NEP1 and a first light emitting section EP1, and the compensating cycle section includes a second non-light emitting section NEP2 and a second light emitting section EP2. According to an embodiment, a duration of the second non-light emitting section NEP2 may be equal to a duration of the first non-light emitting section NEP1, and a duration of the second light emitting section EP2 may be greater than a duration of the first light emitting section EP1 by the first difference 'd1'. Accordingly, the duty ratio (i.e., compensating duty ratio) of the compensating cycle section may differ from the duty ratio (i.e., reference duty ratio) of the reference cycle section. In this case, the compensating duty ratio may be defined as a proportion, which is occupied by the second light emitting section EP2, of the first compensating period CT1, and the reference duty ratio may be defined as a proportion, which is occupied by the first light emitting section EP1, of the reference period RT.

In an embodiment, although FIGS. 3A and 3B illustrate that the second light emitting section EP2 of the compensating cycle section is extended by the first difference d1, the invention is not limited thereto. For example, as illustrated in FIGS. 4A and 4B, the compensating cycle section may include the second non-light emitting section NEP2, a second light emitting section EP2, and a third non-light emitting section NEP3. According to an embodiment, the duration of the second non-light emitting section NEP2 may be equal to the duration of the first non-light emitting section NEP1, and the duration of the second light emitting section EP2 may be equal to the duration of the first light emitting section EP1. Meanwhile, when compared to the compensating cycle section illustrated in FIG. 3B, the compensating cycle section of FIG. 4B may further include the third non-light emitting section NEP3, and the duration of the third non-light emitting section NEP3 may correspond to the first difference d1.

In an embodiment and as described above, as the compensating cycle section has the first compensating period CT1 or CT1*a* which is greater than the reference period RT by the first difference d1, the terminating time point of the compensating cycle section may be matched with the terminating time point of the first frame section DF1. Accordingly, even if the first display period DT1 is not matched with the integer multiple of the reference period RT, the terminating time point of the compensating cycle section may be matched with the terminating time point of the first frame section DF1 by adjusting the first compensating period CT1 or CT1*a*. Accordingly, this may remove or reduce a flicker phenomenon occurring when the first display period DT1 is not matched with the integer multiple of the reference period RT.

In an embodiment and referring back to FIGS. 3A and 4A, the light emitting control block 120 may adjust the reference period RT and (or) the reference duty ratio of the reference cycle section of the light emitting cycle AID cycle, based on the first difference 'd1', and may control the display panel DP to emit light with the adjusted cycle section, during the next frame section. For example, the display panel DP in the second frame section DF2 may emit light during the first adjusted cycle section having an adjusted period AT1 (i.e., the first adjusted period). The second display period DT2 may be equal to the integer multiple (i.e., 4×AT1) of the first adjusted period AT1.

In an embodiment, in the second frame section DF2, the difference between the second display period DT2 and the integer multiple (e.g., 4×RT) of the reference period RT may be maintained to the first difference 'd1'. In this case, the light emitting control block 120 may allow the display panel DP to emit light during the first adjusted cycle section having the first adjusted period AT1, even in the next frame section. In the third frame section DF3, the difference between the third display period DT3 and the integer multiple (e.g., 4×RT) of the reference period RT may be changed to a second difference 'd2'.

In an embodiment, the third frame section DF3 may correspond to 'k' number of reference cycle sections and one compensating cycle section. The period (i.e., a second compensating period CT2) of the compensating cycle section may be greater than the first adjusted period AT1 by a value d2−1 obtained by subtracting the first difference d1 from the second difference d2. The duty ratio of the compensating cycle section may differ from the duty ratio of each of 'k' number of reference cycle sections. The compensating cycle section may follow 'k' number of reference cycle sections.

In addition, in an embodiment, the light emitting control block 120 may re-adjust the reference period RT and (or) the reference duty ratio of the reference cycle section of the light emitting cycle AID cycle, based on the second difference d2. For example, the display panel DP in the fourth frame section DF4 may emit light during the second adjusted cycle section having the re-adjusted period AT2 (i.e., a second adjusted period). The fourth display period DT4 may be equal to the integer multiple (i.e., 4×AT2) of the second adjusted period AT2.

In an embodiment, in the fourth frame section DF4, the difference between the fourth display period DT4 and the integer multiple (e.g., 4×RT) of the reference period RT may be maintained to the second difference 'd2'. In this case, the light emitting control block 120 may allow the display panel DP to emit light during the second adjusting cycle section having the second adjusted period AT2, even in the next frame section (i.e., the fifth frame section DF5). In the fifth frame section DF5, when the difference between the fifth display period DT5 and the integer multiple (e.g., 4×RT) of the reference period RT is maintained to the second difference 'd2', the fifth display period DT5 may be equal to the integer multiple (i.e., 4×AT2) of the second adjusted period AT2.

In an embodiment and referring to FIGS. 3B, 4B, and 5, each reference cycle section includes a first non-light emitting section NEP1 and a first light emitting section EP1, and the first adjusted cycle section includes a first adjusted non-light emitting section NEPa and a first adjusted light emitting section EPa. According to an embodiment, the duration of the first adjusted non-light emitting section NEPa may be equal to the duration of the first non-light emitting section NEP1, and the duration of the first adjusted light emitting section EPa may be greater than the duration of the first light emitting section EP1 by the first sub-difference d1/4. Accordingly, the first adjusted period AT1 may be greater than the reference period RT by the first sub-difference d1/4. However, the invention is not limited thereto. For example, in the state that the first adjusted period AT1 is greater than the reference period RT by the first sub-difference (d1/4), a duration of the first adjusted non-light emitting section NEPa and a duration of the first adjusted light emitting section EPa may differ from the duration of the first non-light emitting section NEP1 and the duration of the first light emitting section EP1, respectively. In an embodiment, the duty ratio of the first adjusted cycle section may differ from the duty ratio of the reference cycle section.

In an embodiment, the second adjusted cycle section includes a second adjusted non-light emitting section NEPb and a second adjusted light emitting section EPb. According to an embodiment, a duration of the second adjusted non-light emitting section NEPb may be equal to the duration of the first non-light emitting section NEP1, and a duration of the second adjusted light emitting section EPb may be greater than the duration of the first light emitting section EP1 by the second sub-difference d2/4. Accordingly, the second adjusted period AT2 may be greater than the reference period RT by the second sub-difference d2/4. However, the invention is not limited thereto. For example, in the state that the second adjusted period AT2 is greater than the reference period RT by the second sub-difference (d2/4), the duration of the second adjusted non-light emitting section NEPb and the duration of the second adjusted light emitting section EPb may differ from the duration of the first non-light emitting section NEP1 and the duration of the first light emitting section EP1, respectively. In an embodiment, the duty ratio of the second adjusted cycle section may differ from the duty ratio of the reference cycle section.

As described above, in an embodiment, the display period of the present frame section is compared with the integer multiple of the reference period in every frame section. When the difference is made between the display period of the present frame section and the integer multiple of the reference period, the reference period is changed to the adjusted period based on the difference, such that the terminating time point of the adjusted cycle section is matched with the terminating time point of each of the frame sections. Accordingly, even if the display periods DT1 to DT5 are not matched with the integer multiple of the reference period RT, the flicker phenomenon may be prevented or reduced.

Figure 6A:
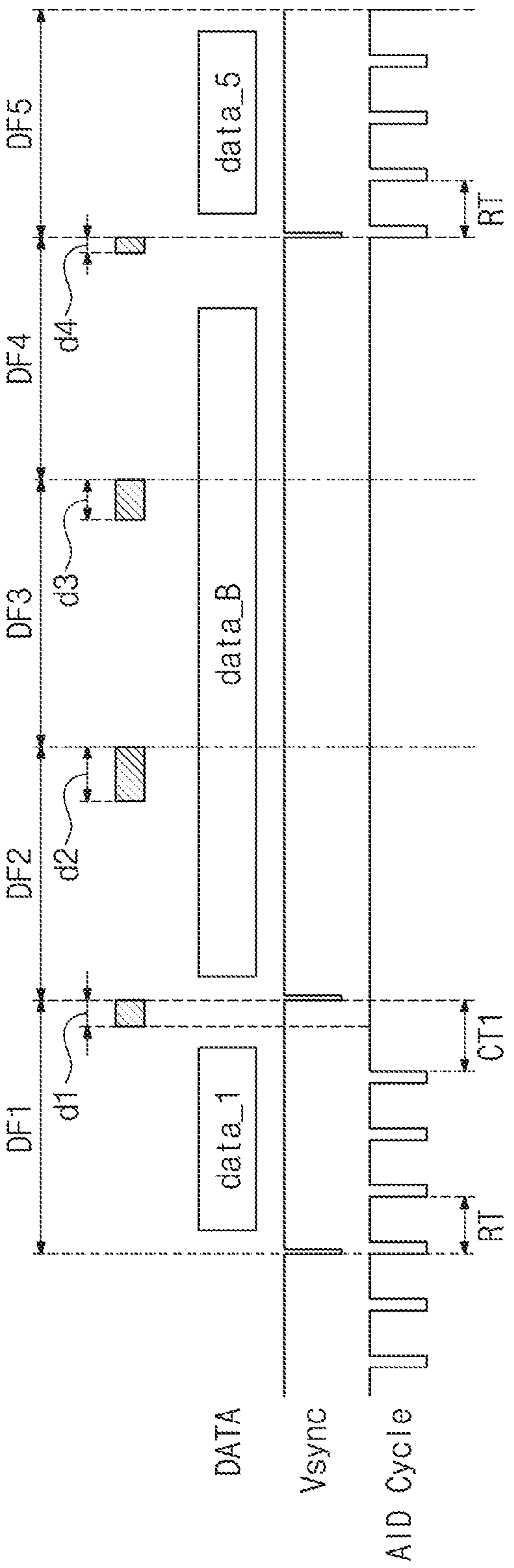
FIG. 6A is a timing diagram illustrating the operation of a display device, according to an embodiment.
Figure 6B:
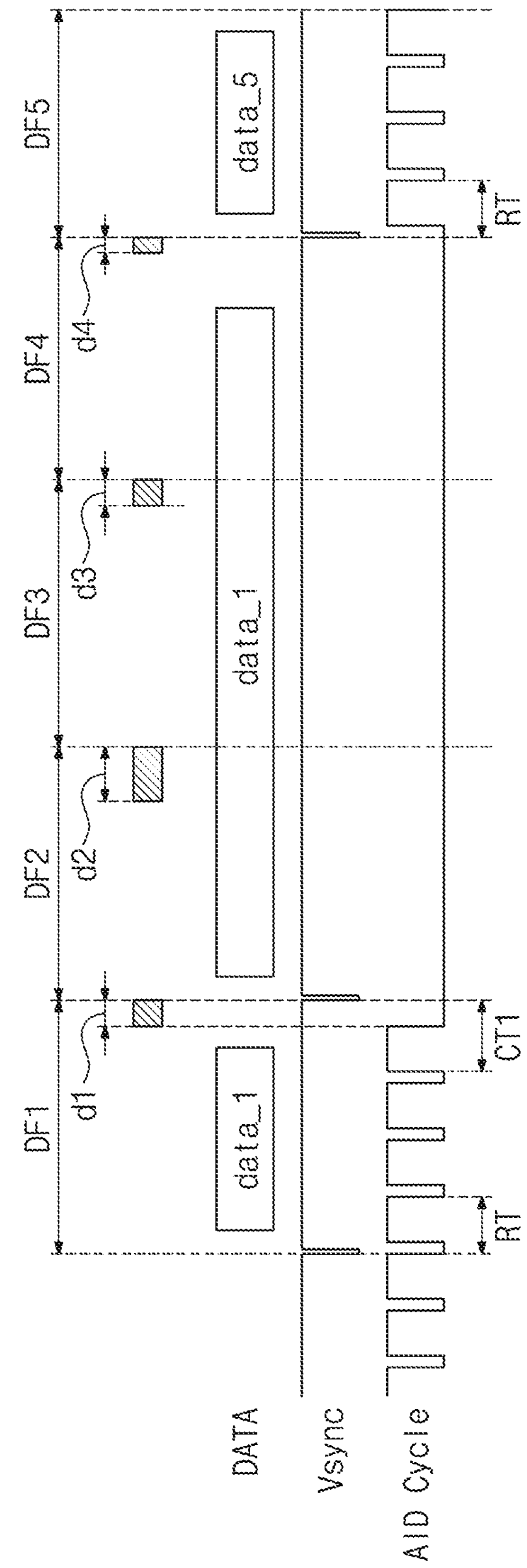
FIG. 6B is a timing diagram illustrating the operation of a display device, according to an embodiment.

FIGS. 6A and 6B are timing diagrams illustrating the operation of a display device, according to embodiments. However, the same reference numerals are assigned to the same components as those illustrated in FIGS. 3A and 4A of the components illustrated in FIGS. 6A and 6B, and the details thereof will be omitted to avoid redundancy.

In an embodiment and referring to FIGS. 6A and 6B, the light emitting control block 120 may compare the display periods DT1 to DT5 with the integer multiple of the reference period RT at every frame section. When each of the display periods DT1 to DT5 is different than the integer multiple of the reference period RT, based on the comparison result, the difference (hereinafter, the first to fourth difference (d1, d2, d3, and d4, respectively)) between the display periods DT1 to DT5 and the integer multiple of the reference period RT may be calculated. For example, the light emitting control block 120 may calculate the difference between the first display period DT1 and the integer multiple (e.g., 4×RT) of the reference period RT to the first difference d1 when the first display period DT1 differs from the integer multiple (4×RT) of the reference period RT in the first frame section DF1. For example, the light emitting control block 120 may calculate the difference between the second display period DT2 and the integer multiple (4×RT) of the reference period RT to the second difference (d2), when the second display period DT2 differs from the integer multiple (4×RT) of the reference period RT in the second frame section DF2. For example, the light emitting control block 120 may calculate the difference between the third display period DT3 and the integer multiple (e.g., 4×RT) of the reference period RT to the third difference (d3), when the third display period DT3 differs from the integer multiple (4×RT) of the reference period RT in the third frame section DF3. For example, the light emitting control block 120 may calculate the difference between the fourth display period DT4 and the integer multiple (4×RT) of the reference period RT to the fourth difference (d4), when the fourth display period DT4 differs from the integer multiple (4×RT) of the reference period RT in the fourth frame section DF4. In the fifth frame section DF5, the fifth display period DT5 and the integer multiple (e.g., 4×RT) of the reference period RT may be matched with each other.

In an embodiment, the driving controller 100 may output black image data data B to the data driver 200 (see FIG. 1) or output image data of a previous frame to the data driver 200 (see FIG. 1), from a frame section (i.e., the second frame section DF2) next to the first frame section DF1 in which the first difference d1 is made, till the fifth frame section DF5 in which the difference is not made. The black image data data B may be image data having a black grayscale level.

In an embodiment, the light emitting cycle AID cycle may be held (or maintained) in a specific state, during the second to fourth frame sections DF2 to DF4, respectively. According to an embodiment, the specific state may be one of an inactive state (e.g., a low level state) and an active state (e.g., a high level state). According to an embodiment, the light emitting cycle AID cycle may be held in an active state, when black image data data_B is output during the second to fourth frame sections DF2 to DF4, respectively, in which the differences d1 to d4 are made. Accordingly, the display panel DP (see FIG. 1) may display a black image during the second to fourth frame sections DF2 to DF4, respectively. Accordingly, the flicker phenomenon may be prevented from being viewed due to the differences d1 to d4.

According to an embodiment, the image data of the previous frame may be image data (e.g., first image data data_1) in a frame section (i.e., the first frame section DF1) in which a difference is first made. As illustrated in FIG. 6B, the light emitting cycle AID cycle may be held in the inactive state, during the second to fourth frame sections DF2 to DF4, respectively, in which the difference d1 to d4 are made. Accordingly, even if the first image data data_1 is output during the second to fourth frame sections DF2 to DF4, respectively, the display panel DP may display a black image. Accordingly, the flicker phenomenon may be prevented from being viewed due to the differences d1 to d4.

FIG. 7 is a block diagram of a display device, according to an embodiment.

In an embodiment and referring to FIG. 7, a display device DD includes the display module DM and the display driver circuit DDIC. The display driver circuit DDIC may include the driving controller 100, the data driver 200, and the voltage generator 400. The display module DM may include the display panel DP, the scan driver 300, and the light emitting driver 350.

In an embodiment, the display panel DP includes the plurality of pixels PX, a plurality of initialization scan lines SIL1 to SILn, a plurality of compensating scan lines SCL1 to SCLn, a plurality of write scan lines SWL1 to SWLn+1, a plurality of light emitting control lines EML1 to EMLn, and a plurality of data lines DL1 to DLm. The display panel DP may be defined with an active region AA and a non-active region NAA. The initialization scan lines SIL1 to SILn, the compensating scan lines SCL1 to SCLn, the write scan lines SWL1 to SWLn+1, the light emitting control lines EML1 to EMLn, the data lines DL1 to DLm, and the pixels PX may be overlapped with the active region AA. The initialization scan lines SIL1 to SILn, the compensating scan lines SCL1 to SCLn, the write scan lines SWL1 to SWLn+1, and the light emitting control lines EML1 to EMLn may extend in a first direction DR1. The initialization scan lines SIL1 to SILn, the compensating scan lines SCL1 to SCLn, the write scan lines SWL1 to SWLn+1, and the light emitting control lines EML1 to EMLn may be arranged to be spaced apart from each other in the second direction DR2. The data lines DL1 to DLm are arranged to be spaced apart from each other in the first direction DR1 while extending in the second direction DR2.

In an embodiment, the plurality of pixels PX are electrically connected to the initialization scan lines SIL1 to SILn, the compensating scan lines SCL1 to SCLn, the write scan lines SWL1 to SWLn+1, the light emitting control lines EML1 to EMLn, and the data lines DL1 to DLm. The plurality of pixels PX may be electrically connected to four scan lines. For example, as illustrated in FIG. 7, a first row of pixels may be connected to the first initialization scan line SIL1, the first compensating scan line SCL1, and the first and second write scan lines SWL1 and SWL2. For example, a second row of pixels may be connected to the second initialization scan line SIL2, the second compensating scan line SCL2, and the second and third write scan lines SWL2 and SWL3. However, the number of scan lines, which are connected to each pixel PX is not limited thereto, but the number of scan lines connected to each pixel PX may be varied. In another embodiment, the plurality of pixels PX may be electrically connected to five scan lines, respectively. In this case, the display panel DP may further include black scan lines.

In an embodiment, the scan driver 300 and the light emitting driver 350 may be disposed in the non-active region NAA of the display panel DP. The scan driver 300 may output initialization scan signals to the initialization scan lines SIL1 to SILn, output compensation scan signals to the compensation scan lines SCL1 to SCLn, and output write scan signals to the write scan lines SWL1 to SWLn+1, in response to the second driving control signal SCS.

In an embodiment, the light emitting driver 350 receives the third driving control signal ECS from the driving controller 100. The light emitting driver 350 may output the light emitting control signals to the light emitting control lines EML1 to EMLn, in response to the third driving control signal ECS. In another embodiment, the scan driver 300 may be connected to the light emitting control lines EML1 to EMLn. In this case, the scan driver 300 may output light emitting control signals to the light emitting control lines EML1 to EMLn.

In an embodiment, each of the pixels PX may include the light emitting element ED (see FIG. 8) and the pixel circuit part PXC (see FIG. 8) to control the light emitting element ED to emit light from the light emitting element ED. The pixel circuit part PXC may include a plurality of transistors and a capacitor. The scan driver 300 and the light emitting driver 350 may include transistors formed through the same process as that of the pixel circuit part PXC.

In an embodiment, each of the plurality of pixels PX receives the first driving voltage ELVDD, the second driving voltage ELVSS, the first initialization voltage VINT, and the second initialization voltage AINT from the voltage generator 400.

In an embodiment, the display device DD may operate at a normal frequency mode (or a first mode) in which the frame rate is fixed, or a variable frequency mode (or a second mode) in which the frame rate is varied.

Figure 8:
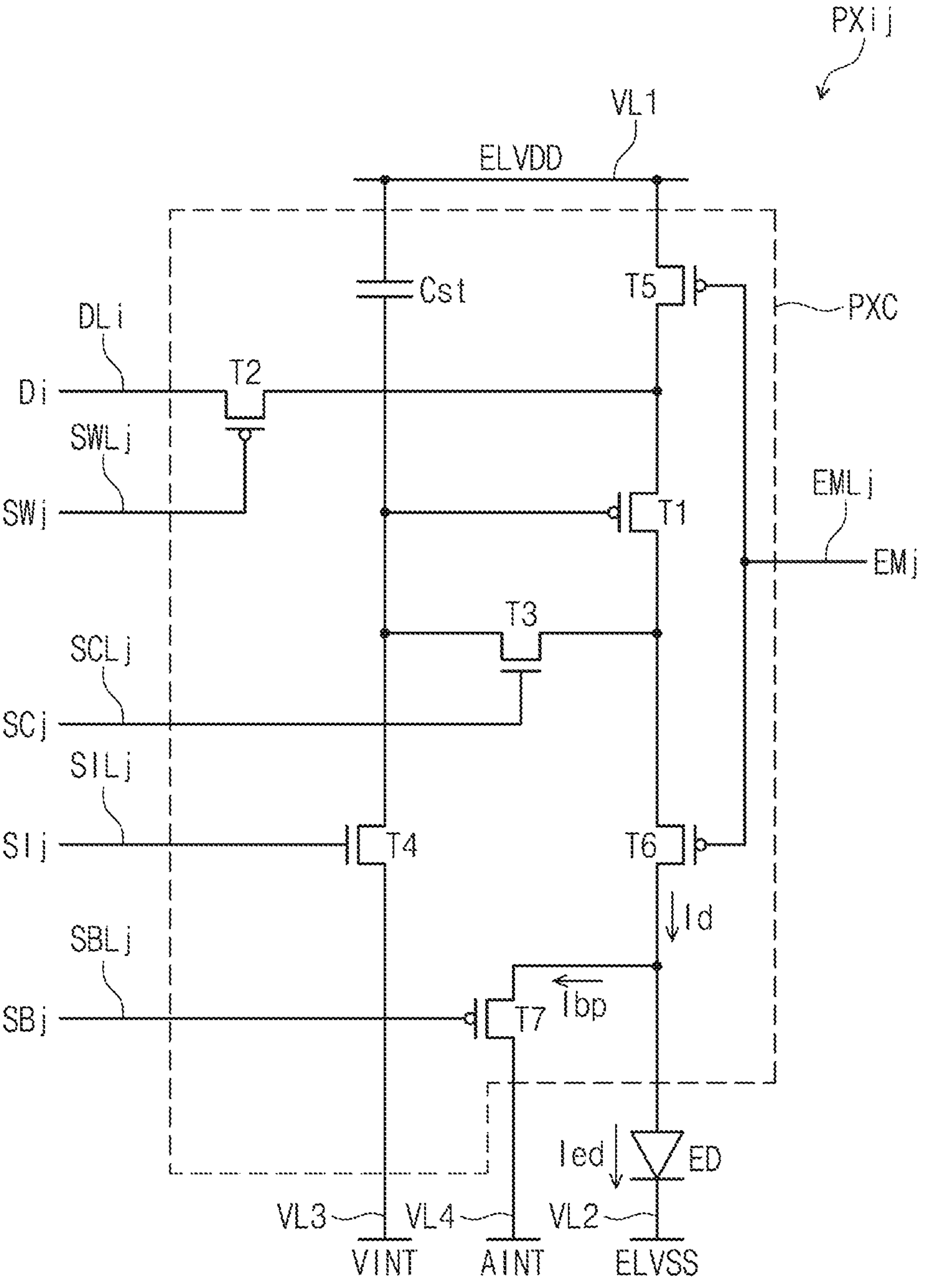
FIG. 8 is a circuit diagram of a pixel, according to an embodiment.
Figure 9A:
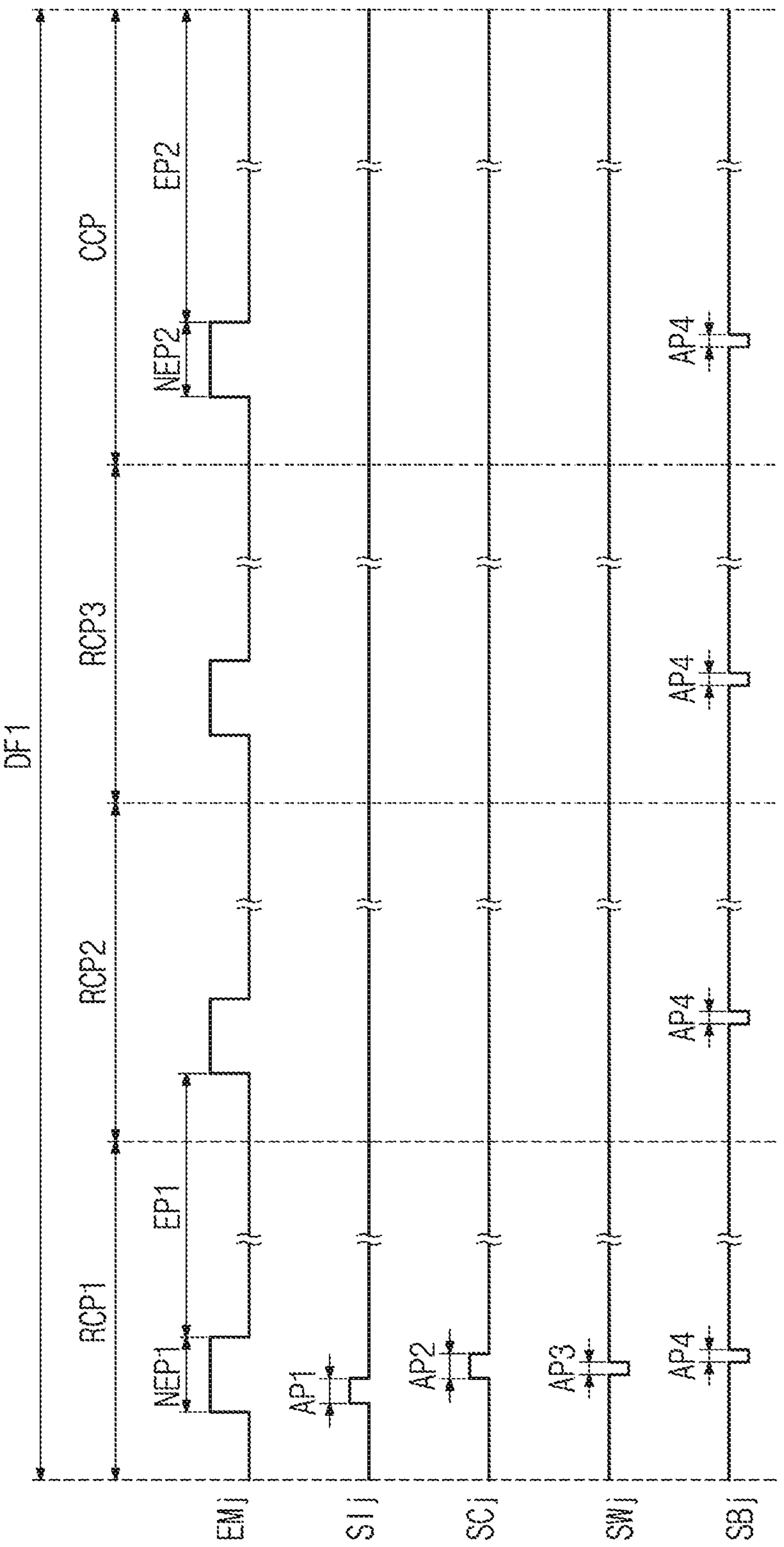
FIG. 9A is a timing diagram illustrating the operation of a display device, according to embodiments.
Figure 9B:
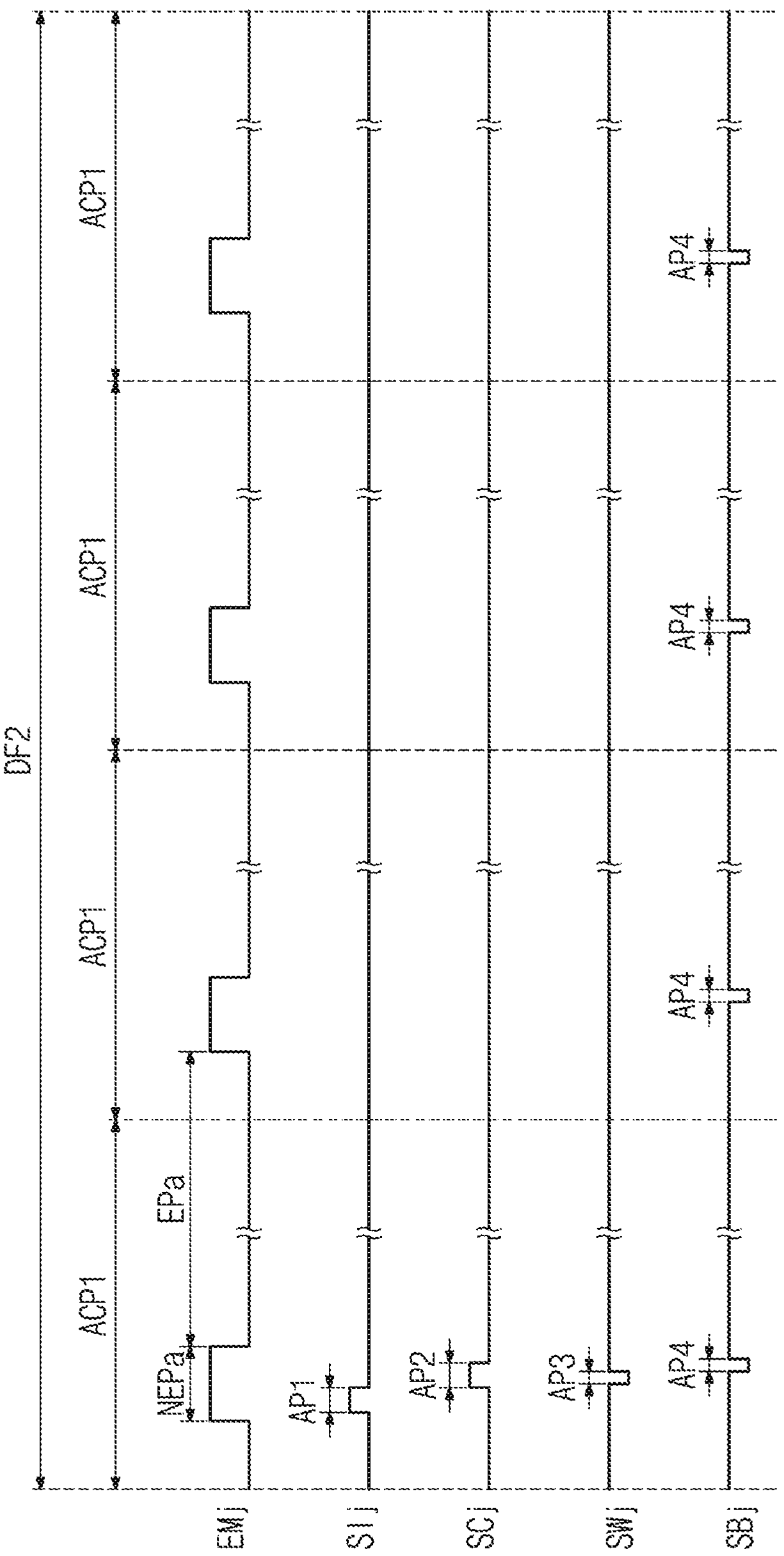
FIG. 9B is a timing diagram illustrating the operation of a display device, according to embodiments.
Figure 9C:
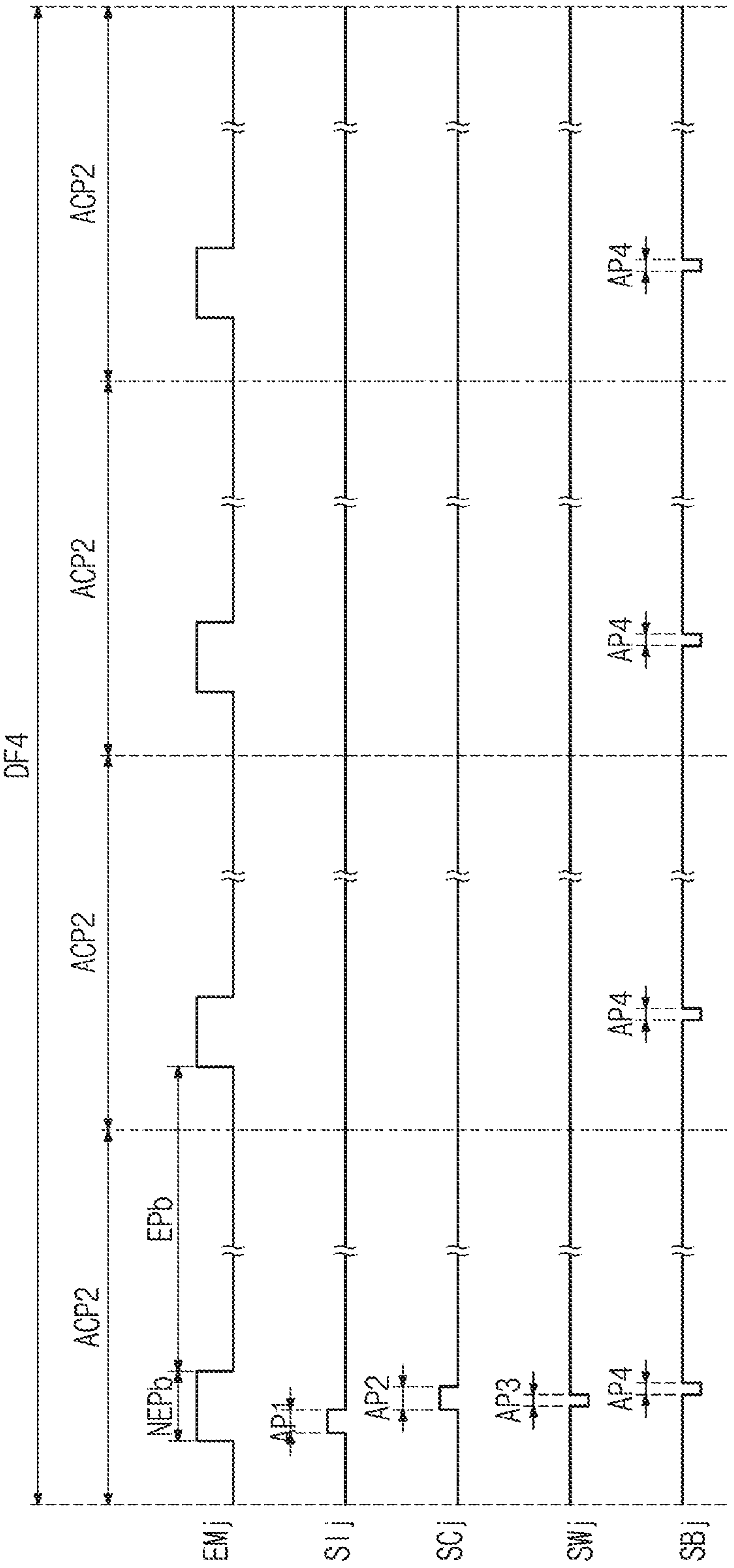
FIG. 9C is a timing diagram illustrating the operation of a display device, according to embodiments.

FIG. 8 is a circuit diagram of a pixel, according to an embodiment, and FIGS. 9A, 9B, and 9C are timing diagrams illustrating the operation of a display device, according to an embodiment.

In an embodiment, FIG. 8 illustrates an equivalent circuit diagram of one pixel PX of the plurality of pixels PX illustrated in FIG. 1. Since each of the plurality of pixels PX has the same circuit structure, only a circuit structure of a pixel PXij will be representatively described and the details of remaining pixels PX will be omitted in the following description.

In an embodiment and referring to FIG. 8, the pixel PXij is connected to an i-th data line DLi (hereinafter, a data line) of the data lines DL1 to DLm and a j-th light emitting control line EMLj (hereinafter, a light emitting control line) of the light emitting control lines EML1 to EMLn. The pixel PXij is connected to a j-th initialization scan line SILj (hereinafter, an initialization scan line) of the initialization scan lines SIL1 to SILn, a j-th write scan line SWLj (hereinafter, a write scan line) of write scan lines SWL1 to SWLn+1, and a j-th black scan line SBLj (hereinafter, a black scan line). In addition, the pixel PXij is connected to a j-th compensating scan line SCLj (hereinafter, a compensating scan line) of compensating scan lines SCL1 to SCLn. In another embodiment, the pixel PXij may be connected to a (j+1)-th write scan line instead of a j-th black scan line SBLj.

In an embodiment, the pixel PXij includes the light emitting element ED and the pixel circuit part PXC. The light emitting element ED may include a light emitting diode. The light emitting diode may include an organic light emitting material, an inorganic light emitting material, a quantum dot, or a quantum rod, as a light emitting layer.

In an embodiment, the pixel circuit part PXC includes first to seventh transistors T1, T2, T3, T4, T5, T6, and T7, respectively, and one capacitor Cst. Each of the first to seventh transistors T1 to T7, respectively, may be a transistor having a low-temperature polycrystalline silicon (LTPS) semiconductor layer. Some of the first to seventh transistors T1 to T7, respectively, may be P-type transistors, and remaining ones of the first to seventh transistors T1 to T7, respectively, may be N-type transistors. For example, the first, second, and fifth to seventh transistors T1, T2, and T5 to T7, respectively, may be P-type transistors, and the third and fourth transistors T3 and T4, respectively, may be N-type transistors including oxide semiconductors serving as semiconductor layers. However, the configuration of the pixel circuit part PXC according to the invention is not limited to the embodiment illustrated in FIG. 8. The pixel circuit part PXC illustrated in FIG. 8 is provided only for an illustrative purpose, and the configuration of the pixel circuit part PXC may be modified and implemented. For example, in an embodiment, all of the first to seventh transistors T1 to T7, respectively, may be P-type transistors or N-type transistors. In addition, the number of transistors and the number of capacitors included in the pixel circuit part PXC are not particularly limited and may be varied.

In an embodiment, the initialization scan line SILj, the compensating scan line SCLj, the write scan line SWLj, the black scan line SBLj, and the light emitting control line EMLj may transmit a j-th initialization scan signal SIj (hereinafter, an initialization scan signal), a j-th compensating scan signal SCj (hereinafter, a compensating scan signal), a j-th write scan signal SWj (hereinafter, a write scan signal), a j-th black scan signal SBj (hereinafter, a black scan signal), and a j-th light emitting control signal EMj (hereinafter, a light emitting control line) to the pixel PX, respectively. The data line DLi transmits the i-th data signal Di to the pixel PXij. The i-th data signal Di may have a voltage level corresponding to the grayscale level of the relevant image signal of the image signals RGB input to the display device DD (see FIG. 7). Each of the first to fourth driving voltage lines VL1, VL2, VL3 and VL4, respectively, may transmit the first driving voltage ELVDD, the second driving voltage ELVSS, the first initialization voltage VINT, and the second initialization voltage AINT to the pixel PXij.

In an embodiment, the first transistor T1 includes a first electrode connected to the first driving voltage line VL1 through the fifth transistor T5, a second electrode electrically connected to an anode of the light emitting element ED through the sixth transistor T6, and a gate electrode connected to one terminal of the capacitor Cst. The first transistor T1 may receive the i-th data signal Di received through the data line DLi depending on the switching operation of the second transistor T2 and supply a driving current Id to the light emitting element ED.

In an embodiment, the second transistor T2 includes a first electrode connected to the data line DLi, a second electrode connected to the first electrode of the first transistor T1, and a gate electrode connected to the scan line SWLj. The second transistor T2 may be turned on in response to a write scan signal SWj received through the j-th write scan line SWLj to transmit the i-th data signal Di, which is received through the data line DLi, to the first electrode of the first transistor T1.

In an embodiment, the third transistor T3 includes a first electrode connected to the second electrode of the first transistor T1, a second electrode connected to the gate electrode of the first transistor T1, and a gate electrode connected with the scan line SCLj. The third transistor T3 may be turned on in response to the compensating scan signal SCj received through the compensating scan line SCLj to connect the gate electrode of the first transistor T1 to the second electrode of the first transistor T1, such that the first transistor T1 is diode-connected.

In an embodiment, the fourth transistor T4 includes a first electrode connected to the gate electrode of the first transistor T1, a second electrode connected to the third driving voltage line VL3 for transmitting the first initialization voltage VINT, and a gate electrode connected to the initialization scan line SILj. The fourth transistor T4 may be turned on in response to the initialization scan signal SIj received through the initialization scan line SILj to perform an initialization operation for transmitting the first initialization voltage VINT1 to the gate electrode of the first transistor T1 to initialize the voltage across the gate electrode of the first transistor T1.

In an embodiment, the fifth transistor T5 includes a first electrode connected to the first driving voltage line VL1, a second electrode connected to the first electrode of the first transistor T1, and a gate electrode connected to the light emitting control line EMLj.

In an embodiment, the sixth transistor T6 includes a first electrode connected to the second electrode of the first transistor T1, a second electrode connected to the anode of the light emitting element ED, and a gate electrode connected to the light emitting control line EMLj.

In an embodiment, the fifth transistor T5 and the sixth transistor T6 may be simultaneously turned on in response to the light emitting control signal EMj received through the light emitting control line EMLj. The first driving voltage ELVDD received through the fifth transistor T5, which is turned on, may be compensated through the first transistor T1 diode-connected and transmitted to the light emitting element ED.

In an embodiment, the seventh transistor T7 includes a first electrode connected to a second electrode of the first transistor T6, a second electrode connected to the fourth driving voltage line VL4 for transmitting the second initialization voltage AINT, and a gate electrode connected to the black scan line SBLj.

In an embodiment, one terminal of the capacitor Cst is connected to the gate electrode of the first transistor T1, and another terminal of the capacitor Cst is connected to the first driving voltage line VL1, as described above. A cathode of the light emitting element ED may be connected to the second driving voltage line VL2 which transmits the second driving voltage ELVSS.

In an embodiment and referring to FIGS. 8 and 9A, the display panel DP (see FIG. 7) may display an image for the first frame section DF1 corresponding to the first frame rate. The first frame section DF1 may include k number of reference cycle sections (hereinafter, first to third reference cycle sections RCP1, RCP2, and RCP3, respectively), and one compensating cycle section CCP. In this case, ‘k’ may be an integer equal to or greater than “1”. Although FIG. 9A illustrates that ‘k’ is ‘3’, ‘k’ may be varied depending on the frame rate. Each of the first to third reference cycle sections RCP1, RCP2, and RCP3, respectively, has the reference period RT (see FIG. 3A) and the compensating cycle section has the compensating period CT1 (see FIG. 3A). The light emitting control signal EMj supplied from the light emitting control line EMLj may include the first light emitting section EP1 and the first non-light emitting section NEP1 in each of the first to third reference cycle sections RCP1, RCP2, and RCP3, respectively. According to an embodiment, the first light emitting section EP1 may be a low level section, and the first non-light emitting section NEP1 may be a high level section. The first non-light emitting section NEP1 of the light emitting control signal EMj may be overlapped with the first to fourth active sections AP1, AP2, AP3, and AP4, respectively, in the first reference cycle section RCP1. The first light emitting section EP1 of the light emitting control signal EMj for the first reference cycle section RCP1 may be in a non-overlap state with the first to fourth active sections AP1, AP2, AP3, and AP4, respectively.

In an embodiment, a plurality of scan signals SIj, SCj, SWj, and SBj may be activated during the first non-light emitting section NEP1 of the first reference cycle section RCP1. In more detail, the initialization scan signal SIj includes the first active section AP1 with a high level within the first non-light emitting section NEP1 of the first reference cycle section RCP1, and the compensating scan signal SCj includes the second active section AP2 having a high level within the first non-light emitting section NEP1 of the first reference cycle section RCP1. The write scan signal SWj includes the third active section AP3 having a low level within the first non-light emitting section NEP1 of the first reference cycle section RCP1, and the black scan signal SBj includes the fourth active section AP4 having a low level within the first non-light emitting section NEP1 of the first reference cycle section RCP1. According to an embodiment, the black scan signal SBj may further include a fourth active section AP4 having a low level in the second and third reference cycle sections RCP2 and RCP3 and the compensating cycle section CCP, in addition to the first non-light emitting section NEP1 of the first reference cycle section RCP1. In other words, some scan signals SIj, SCj, and SWj of the plurality of scan signals SIj, SCj, SWj, and SBj may have a frequency lower than that of the light emitting control signal EMj, and a remaining scan signal SBj may have a frequency that is the same as that of the light emitting control signal EMj. In another embodiment, the plurality of scan signals SIj, SCj, SWj, and SBj may have the same frequency as that of the light emitting control signal EMj.

In an embodiment, when the initialization scan signal SIj having a high level is provided through the initialization scan line SILj during the first active section AP1, the fourth transistor T4 is turned on in response to the initialization scan signal SIj having a high level. The first initialization voltage VINT is transmitted to the gate electrode of the first transistor T1 through the fourth transistor T4, which is turned on, and the gate electrode of the first transistor T1 is initialized by the first initialization voltage VINT.

In an embodiment, when the compensating scan signal SCj having a high level is supplied through the compensating scan line SCLj during the second active section AP2, the third transistor T3 is turned on. During the second active section AP2, the first transistor T1 is diode-connected by the third transistor T3 turned on and forward biased. The second active section AP2 of the compensating scan signal SCj may be in a non-overlap state with the first active section AP1 of the initialization scan signal SIj. In addition, the first active section AP1 of the initialization scan signal SIj leads the second active section AP2 of the compensating scan signal SCj.

According to an embodiment, the second active section AP2 of the compensating scan signal SCj is defined as a section in which the compensating scan signal SCj has a high level, and the first active section AP1 of the initialization scan signal SIj is defined as a period in which the initialization scan signal SIj has a high level. When the third transistor T3 and the fourth transistor T4 are P-type transistors, the second active section AP2 of the compensating scan signal SCj is defined as a section in which the compensating scan signal SCj has a low level, and the first active section AP1 of the initialization scan signal SIj is defined as a section in which the initialization scan signal SIj has a low level.

In an embodiment, the second active section AP2 may be overlapped with the third active section AP3 in which the write scan signal SWj having a low level is generated. The second transistor T2 is turned on by the write scan signal SWj having a low level for the third active section AP3. However, the compensating voltage "Di-Vth" obtained by subtracting the threshold voltage "Vth" of the first transistor T1 from the data signal Di supplied from the data line DLi, is applied to the gate electrode of the first transistor T1. In other words, the potential of the gate electrode of the first transistor T1 may be the compensating voltage "Di-Vth".

In an embodiment, the first driving voltage ELVDD and the compensating voltage "Di-Vth" may be applied at opposite terminals of the capacitor Cst, and charges corresponding to the difference in voltage between the opposite terminals may be stored in the capacitor Cst.

In an embodiment, the seventh transistor T7 may receive the black scan signal SBj in a low level through the black scan line SBLj and may be turned on during the fourth active section AP4. A portion of the driving current Id may be discharged through the seventh transistor T7 as the bypass current Ibp.

In an embodiment, when the pixel PXij displays a black image, and when the light emitting element ED emits light even if the minimum driving current flows through the first transistor T1 as the driving current Id, it is difficult for the pixel PXij to normally display the black image. Therefore, according to an embodiment, the seventh transistor T7 in the pixel PXij may distribute a portion, which serves as the bypass current Ibp, of the minimum driving current of the first transistor T1 to a current path other than a current path toward the light emitting element ED. In this case, the minimum driving current of the first transistor T1 refers to a current flowing to the first transistor T1 under a condition of turning off the first transistor T1, as the gate-source voltage Vgs of the first transistor T1 is lower than the threshold voltage Vth. As described above, under the condition of turning off the first transistor T1, the minimum driving current (e.g., a current of 10 pA or less) flowing to the first transistor T1 is transmitted to the light emitting element ED to display an image of a black grayscale level. When the pixel PXij displays the black image, the influence of the bypass current Ibp on the minimum driving current Id is relatively large, whereas when an image such as a normal image or a white image is displayed, the influence of the bypass current Ibp on the driving current Id is relatively little. Accordingly, when the black image is displayed, a current (i.e., the light emitting current led) reduced by the quantity of the bypass current Ibp, which flows out of the seventh transistor T7, from the driving current Id is provided to the light emitting element ED to firmly express the black image. Accordingly, the pixel PXij may implement an accurate black grayscale image using the seventh transistor T7. Accordingly, the contrast ratio may be improved.

In an embodiment, the fifth transistor T5 and the sixth transistor T6 are turned on by the light emitting control signal EMj having the low level. Then, the driving current Id is generated due to the voltage difference between the gate voltage of the gate electrode of the first transistor T1 and the first driving voltage ELVDD, and the driving current Id is supplied to the light emitting element ED through the sixth transistor T6. Therefore, the light emitting current led flows through the light emitting element ED during the first light emitting section EP1. Accordingly, light having brightness corresponding to the light emitting current led may be output from the light emitting element ED.

In an embodiment and referring to FIGS. 8 and 9B, the display panel DP (see FIG. 7) may display an image during the second frame section DF2 corresponding to the second frame rate. The second frame section DF2 may include k number of first adjusted cycle sections ACP1. In this case, 'k' may be an integer equal to or greater than "1". Although FIG. 9B illustrates a case in which 'k' is 4, 'k' may be varied depending on a frame rate. Each of the first adjusted cycle sections ACP1 has the first adjusted period AT1 (see FIG. 3A) different from the reference period RT (see FIG. 3A). The light emitting control signal EMj supplied from the light emitting control line EMLj may include the first adjusted light emitting section EPa and the first adjusted non-light emitting section NEPa in each of the first adjusted cycle sections ACP1. According to an embodiment, the first adjusted light emitting section EPa may be a low level section, and the first adjusted non-light emitting section NEPa may be a high-level section. According to an embodiment, the duration of the first adjusted light emitting section EPa may be different from the duration of the first light emitting section EP1.

In an embodiment, the first adjusted non-light emitting section NEPa of the light emitting control signal EMj may be overlapped with the first to fourth active sections AP1, AP2, AP3, and AP4, respectively, in at least one of the first adjusted cycle sections ACP1. During the first adjusted cycle section ACP1, the first adjusted light emitting section EPa of the light emitting control signal EMj may be in a non-overlap state with the first to fourth active sections AP1, AP2, AP3, and AP4, respectively.

In an embodiment and referring to FIGS. 8 and 9C, the display panel DP (see FIG. 7) may display an image for the fourth frame section DF4 corresponding to the fourth frame rate. The fourth frame section DF4 may include k number of second adjusted cycle sections ACP2. In this case, "k" may be an integer equal to or greater than "1". Although FIG. 9C illustrates a case in which k is 4, k may be varied depending on a frame rate. Each of the second adjusted cycle sections ACP2 has a second adjusted period AT2 (see FIG. 3A) different from the reference period RT (see FIG. 3A). The light emitting control signal EMj supplied through the light emitting control line EMLj may include the second adjusted light emitting section EPb and the second adjusted non-light emitting section NEPb in each of the second adjusted cycle sections ACP2. According to an embodiment, the second adjusted light emitting section EPb may be a low level section, and the second adjusted non-light emitting section NEPb may be a high level section. According to an embodiment, the duration of the second adjusted light emitting section EPb may be different from the duration of the first light emitting section EP1 and the duration of the first adjusted light emitting section EPa.

In an embodiment, the second adjusted non-light emitting section NEPb of the light emitting control signal EMj may be overlapped with the first to fourth active sections AP1, AP2, AP3, and AP4, respectively, in at least one of the second adjusted cycle sections ACP2. During the second adjusted cycle section ACP2, the second adjusted light emitting section EPb of the light emitting control signal EMj may be in a non-overlap state with the first to fourth active sections AP1, AP2, AP3, and AP4, respectively.

In an embodiment and as described above, the period of the light emitting control signal EMj output from the light emitting driver 350 (see FIG. 7) is varied depending on the difference, thereby improving the problem of deteriorating image quality due to a flicker phenomenon in the variable frequency mode.

Figure 10:
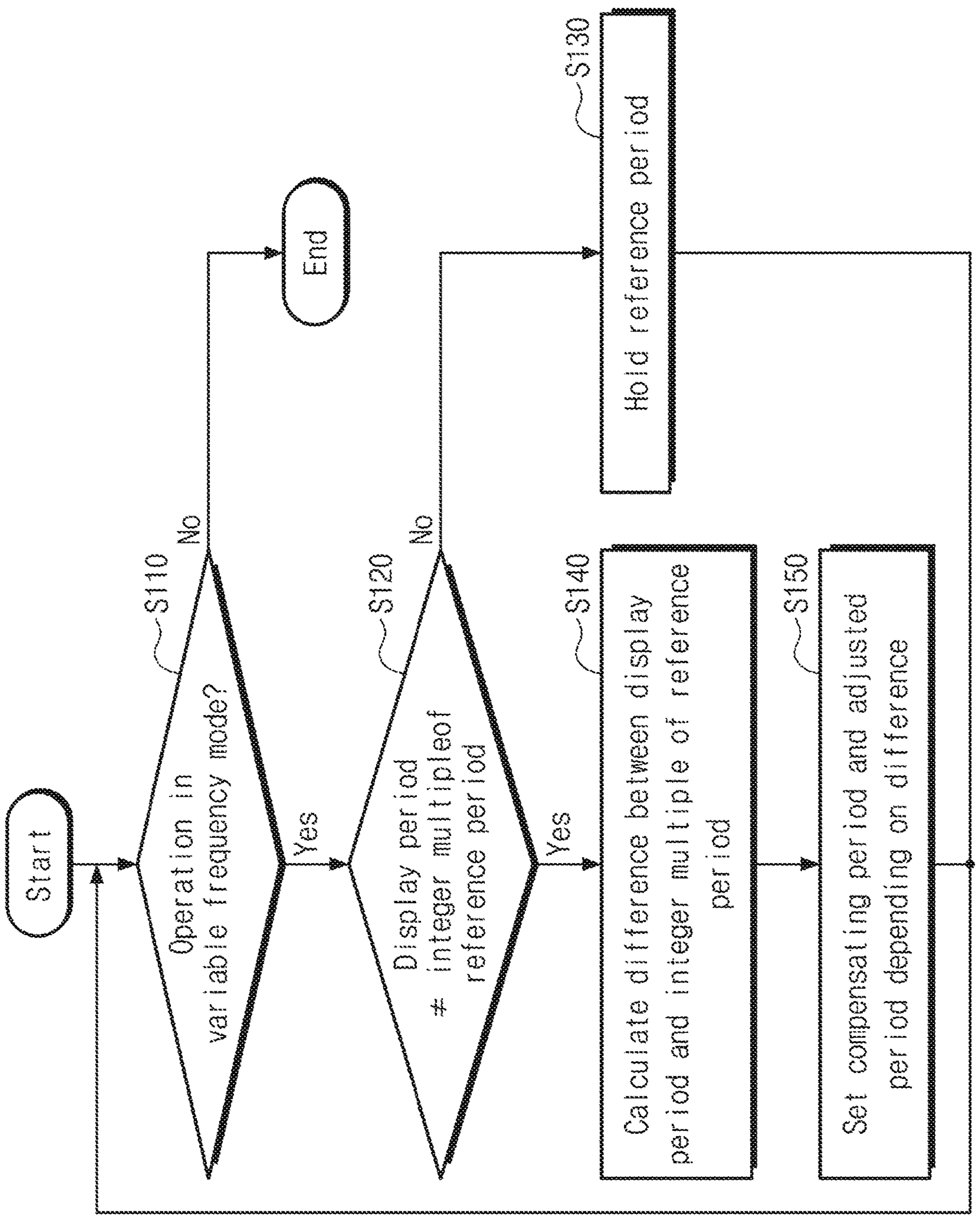
FIG. 10 is a flowchart illustrating the operation of a display device, according to an embodiment.

FIG. 10 is a flowchart illustrating the operation of a display device, according to an embodiment.

In an embodiment and referring to FIGS. 1, 2, 3A, 4A, and 10, the driving controller 100 of the display device DD may determine whether the display device DD operates in a variable frequency mode (S110). As a result of the determination, when the display device DD operates in the variable frequency mode, the operation of reducing a flicker phenomenon according to the invention may be performed. When the display device DD does not operate in the variable frequency mode, the operation of reducing the flicker phenomenon may be terminated without performing the flicker reduction operation.

In an embodiment, when performing an operation of reducing the flicker phenomenon, first, the driving controller 100 may compare the display periods DT1 to DT5 with an integer multiple of the reference period RT (S120). The driving controller 100 may compare the display periods DT1 to DT5 with the reference period RT in every frame section. When the display periods DT1 to DT5 are equal to the reference period RT depending on the comparison result, the light emitting cycle AID cycle may maintain the reference period RT (S130).

However, in an embodiment, when each of the display periods DT1 to DT5 differs from the reference period RT based on the comparison result, the driving controller 100 may calculate the difference between each of the display periods DT1 to DT5 and an integer multiple of the reference period RT (S140). For example, the driving controller 100 may calculate the difference (i.e., the first difference d1) between the first display period DT1 and the integer multiple (e.g., 4×RT) of the reference period RT, when the first display period DT1 differs from the integer multiple (4×RT) of the reference period RT in the first frame section DF1.

In an embodiment, the driving controller 100 may set the compensating periods CT1 and CT2 and the adjusted periods AT1 and AT2 of the light emitting cycle AID cycle based on the difference (S150). For example, when the first difference d1 is made between the first display period DT1 and the integer multiple of the reference period RT in the first frame section DF1, the driving controller 100 may adjust the last reference cycle section corresponding to the first frame section DF1 using a compensating cycle section having the compensating period CT1 which is greater than the reference period RT by the first difference d1.

In addition, in an embodiment, the driving controller 100 may change the period of the light emitting cycle (AID cycle) in the next frame section based on the difference. For example, the driving controller 100 may adjust the light emitting cycle AID cycle to include an adjusted cycle section having a first adjusted period AT1 in the second frame section DF2. The second display period DT2 of the second frame section DF2 may be equal to the integer multiple (i.e., 4×AT1) of the first adjusted period AT1.

In an embodiment and as described above, each of the display periods DT1 to DT5 of the present frame section is compared with the integer multiple of the reference period RT in every frame section. When the difference (i.e., the first difference d1) is made between each of the display periods DT1 to DT5 and the integer multiple (4×RT) of the reference period RT, the reference period RT is changed to the adjusted periods AT1 to AT2 based on the difference. Accordingly, the time point of terminating the light emitting cycle AID cycle may be matched with the time point of terminating the frame sections DF1 to DF5. Accordingly, even when the display periods DT1 to DT5 are not matched with the integer multiple of the reference period RT, the flicker phenomenon may be prevented or reduced.

Figure 11:
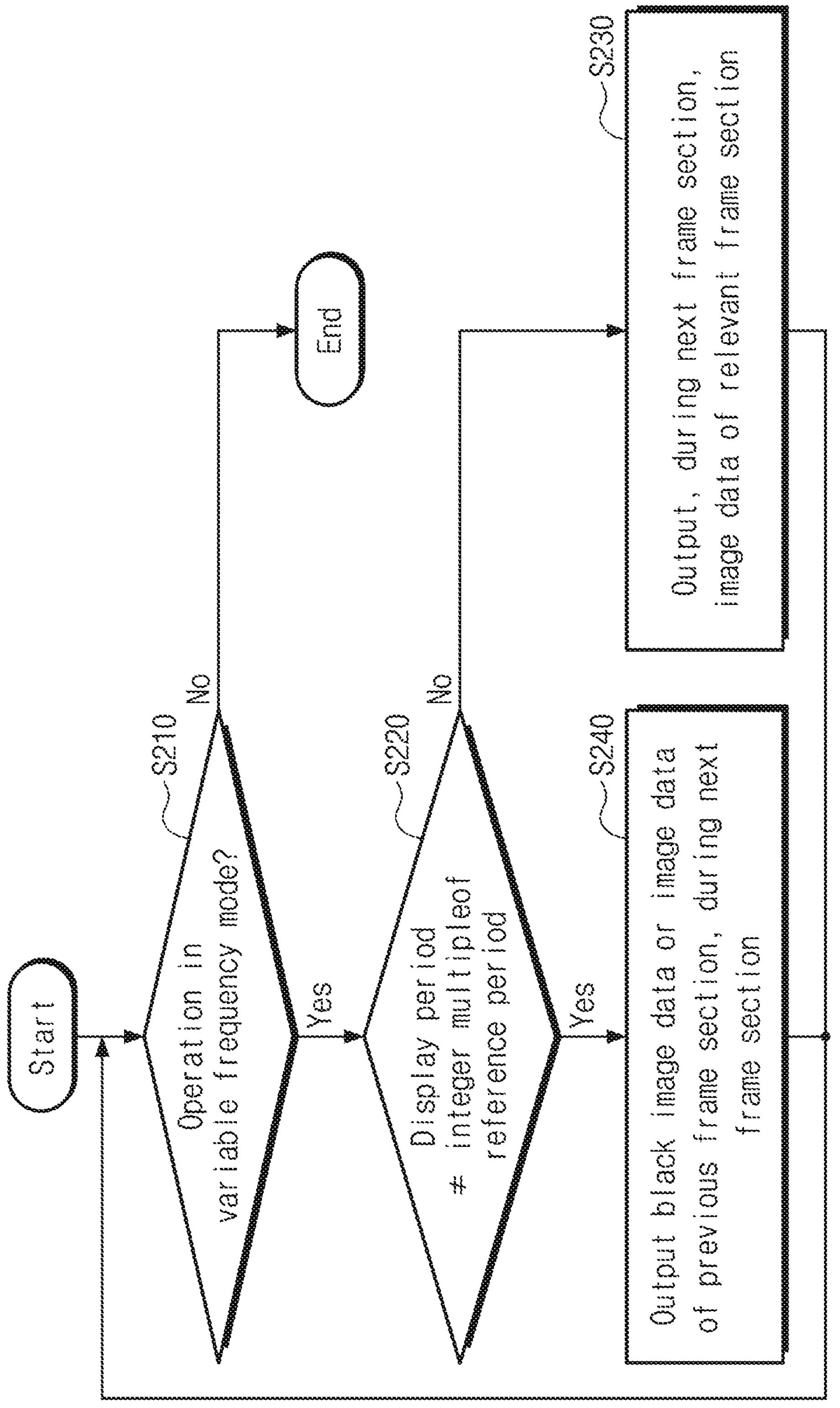
FIG. 11 is a flowchart illustrating the operation of a display device, according to an embodiment.

FIG. 11 is a flowchart illustrating the operation of a display device, according to an embodiment.

In an embodiment and referring to FIGS. 1, 2, 6A, 6B, and 11, the driving controller 100 of the display device DD may determine whether the display device DD operates in a variable frequency mode (S210). When the display device DD operates in the variable frequency mode based on the determination result, the operation of reducing the flicker phenomenon is performed according to the invention. When the display device DD does not operate in the variable frequency mode based on the determination result, the operation of reducing the flicker phenomenon may be terminated without being performed according to the invention.

In an embodiment, when performing an operation of reducing the flicker phenomenon, first, the driving controller 100 may compare the display periods DT1 to DT5 with an integer multiple of the reference period RT (S220). The driving controller 100 may compare the display periods DT1 to DT5 with an integer multiple of the reference period RT in every frame section. When each of the display periods DT1 to DT5 is equal to the integer multiple of the reference period RT, the driving controller 100 may, during a next frame section, output image data of the relevant frame section (S230). In other words, when the first display period DT1 is equal to the integer multiple of the reference period RT, the driving controller 100 may output the second image data data_2 during the second frame section DF2.

However, in an embodiment, when the display periods DT1 to DT5 differ from the integer multiple of the reference period RT, the driving controller 100 may, during a next frame section, output black image data data_B, or may output image data of a previous frame section (S240). For example, when the first display period DT1 is not equal to the integer multiple of the reference period RT, the driving controller 100 may output the black image data data_B instead of the second image data data_2 during the second frame section DF2. In another embodiment, when the first display period DT1 is not equal to the integer multiple of the reference period RT, the driving controller 100 may output first image data data_1 corresponding to the first frame section DF1 instead of the second image data data_2 during the second frame section DF2.

In an embodiment, even if the light emitting cycle AID cycle is maintained (held) in the active state during the second to fourth frame sections DF2 to DF4, respectively, in which the black image data data_B is output, the display panel DP may display the black image. The driving controller 100 may output the black image data data_B until the display periods DT1 to DT5 are equal to the integer multiple of the reference period RT.

In an embodiment, even if the first image data data_1 is output for the second to fourth frame sections DF2 to DF4, respectively, as the light emitting cycle AID cycle is maintained (held) in the inactive state, the display panel DP may display the black image or may maintain a previous image.

In an embodiment and as described above, the display period of the present frame section is compared with the integer multiple of the reference period RT in every frame section. When there is a difference between the display period of the present frame section and the integer multiple of the reference period RT, as the light emitting cycle AID cycle is held to be in the specific state, the flicker phenomenon may be prevented or reduced.

According to an embodiment, the display period of the present frame section is compared with the integer multiple of the reference period in each frame section. When there is a difference between the display period of the present frame section and the integer multiple of the reference period, the last reference cycle section may be changed to the compensating cycle section having the compensating period increased by the difference from the reference period. Accordingly, the time point of terminating the compensating cycle section may be matched with the time point of terminating the present frame section. Accordingly, the flicker phenomenon caused when the display period is not matched with the integer multiple of the reference period may be removed or reduced.

In addition, in an embodiment, the reference cycle section of the next frame section is changed to the adjusted cycle section having the adjusted period according to the difference, thereby preventing or reducing the flicker phenomenon.

Although embodiments of the invention have been described for illustrative purposes, those skilled in the art will appreciate that various modifications, and substitutions are possible, without departing from the scope and spirit of the invention. Accordingly, the scope of the invention is not limited to the detailed description of this specification and/or the appended claims.

While the invention has been described with reference to embodiments thereof, it will be apparent to those of ordinary skill in the art that various changes and modifications may be made thereto without departing from the spirit and scope of the invention. Moreover, the embodiments or parts of the embodiments may be combined in whole or in part without departing from the scope of the invention.

What is claimed is:

1. A display device comprising:

a display panel including a plurality of pixels to emit light in response to a data signal; and a display driver circuit configured to provide the data signal to the display panel, wherein the display driver circuit includes:

a driving controller configured to receive an image signal at a variable frame rate and output image data obtained by converting the image signal in response to a display synchronization signal; and a data driver configured to convert the image data to the data signal and output the data signal, wherein the driving controller includes:

a data converting block configured to convert the image signal to the image data and output the image data for a present frame section determined based on the display synchronization signal;

a light emitting control block configured to compare a reference period of a reference cycle section of a light emitting cycle of the display panel, which is preset, with a display period of the present frame section, a calculating unit to calculate a difference between an integer multiple of the reference period and the display period, when the display period differs from the integer multiple of the reference period;

wherein the light emitting control block is further configured to, adjust the reference period to an adjusted period based on the difference, and output a driving control signal for controlling the display panel to emit light during an adjusted cycle section having the adjusted period, wherein the adjusted cycle section compensates for the difference between the display period and the integer multiple of the reference period.

2. The display device of claim 1, wherein a duty ratio of the adjusted cycle section differs from a duty ratio of the reference cycle section.

3. The display device of claim 1, wherein the present frame section corresponds to a ‘k’ number of reference cycle sections sequentially occurring and one compensating cycle section, wherein ‘k’ is an integer equal to or greater than ‘1’, and wherein a duty ratio of the adjusted cycle section differs from a duty ratio of each of the ‘k’ number of reference cycle sections.

4. The display device of claim 3, wherein the display period is varied depending on the variable frame rate, wherein the display period differs from an integer multiple of the reference period, and wherein a difference between a compensating period of the compensating cycle section and the reference period corresponds to a difference between the integer multiple of the reference period and the display period.

5. The display device of claim 4, wherein each of the ‘k’ number of reference cycle sections includes:

a first non-light emitting section and a first light emitting section, wherein the compensating cycle section includes a second non-light emitting section and a second light emitting section, and wherein a difference between a duration of the second light emitting section and a duration of the first light emitting section corresponds to the difference between the integer multiple of the reference period and the display period.

6. The display device of claim 4, wherein each of the ‘k’ number of reference cycle sections includes:

a first non-light emitting section and a first light emitting section, wherein the compensating cycle section includes a second non-light emitting section, a second light emitting section, and a third non-light emitting section, and wherein a duration of the third non-light emitting section corresponds to the difference between the integer multiple of the reference period and the display period.

7. The display device of claim 1, further comprising:

a scan driver to output a scan signal to the display panel; and a light emitting driver to output a light emitting control signal to the display panel, wherein the light emitting driver is configured to:

receive the driving control signal from the light emitting control block to determine the light emitting cycle of the display panel.

8. The display device of claim 1, wherein the driving controller further includes:

a variable frequency block to calculate the display period of the present frame section, based on the variable frame rate; and a brightness control block to set a reference duty ratio of the reference cycle section, based on a dimming signal.

9. The display device of claim 8, wherein the light emitting control block is configured to:

receive information on the display period from the variable frequency block, and control the adjusted cycle section to have an adjusted duty ratio different from the reference duty ratio of the reference cycle section.

10. The display device of claim 1, wherein the light emitting control block is configured to:

hold the light emitting cycle in a specific state during a next frame section when the display period differs from an integer multiple of the reference period, and output a driving control signal to maintain the light emitting cycle in the specific state until the reference period is adjusted to the adjusted period.

11. The display device of claim 1, wherein the light emitting control block is further configured to:

adjust a reference duty ratio of the reference cycle section based on a dimming signal, and control the adjusted cycle section to have an adjusted duty ratio different from the reference duty ratio of the reference cycle section.

12. The display device of claim 1, wherein the light emitting control block is configured to:

introduce a compensating cycle section that includes a third non-light emitting section, wherein a duration of the third non-light emitting section corresponds to the calculated difference between the integer multiple of the reference period and the display period, and adjust a timing of the compensating cycle section to align a terminating time point of the compensating cycle section with the terminating time point of the present frame section.

13. A display device comprising:

a display panel including a plurality of pixels to emit light in response to a data signal; and a display driver circuit configured to provide the data signal to the display panel, wherein the display driver circuit includes:

a driving controller configured to receive an image signal at a variable frame rate and output image data obtained by converting the image signal in response to a display synchronization signal; and a data driver configured to convert the image data to the data signal and output the data signal, and wherein the driving controller includes:

a data converting block configured to output the image data during a present frame section determined based on the display synchronization signal;

and a light emitting control block configured to-compare a reference period of a reference cycle section of a light emitting cycle of the display panel, which is preset, with a display period of the present frame section, a calculating unit to calculate a difference between an integer multiple of the reference period and the display period, when the display period differs from the integer multiple of the reference period;

wherein the light emitting control block is further configured to, adjust the reference period to an adjusted period based on the difference, output a driving control signal for controlling the display panel to emit light during an adjusted cycle section in which the display panel has the adjusted period from a starting time point of a next frame section having the adjusted period, wherein the adjusted cycle section compensates for the difference between the display period and the integer multiple of the reference period.

14. The display device of claim 13, wherein the present frame section corresponds to a 'k' number of reference cycle sections sequentially occurring and one compensating cycle section, wherein 'k' is an integer equal to or greater than '1', and wherein a duty ratio of the compensating cycle section is different from a duty ratio of each of the 'k' number of reference cycle sections.

15. The display device of claim 14, wherein the difference between a compensating period of the compensating cycle section and the reference period corresponds to the difference between the integer multiple of the reference period and the display period when the display period is different from the integer multiple of the reference period.

16. The display device of claim 15, wherein each of the 'k' number of reference cycle sections includes:

a first non-light emitting section and a first light emitting section, wherein the compensating cycle section includes a second non-light emitting section and a second light emitting section, and wherein a difference between a duration of the second light emitting section and a duration of the first light emitting section corresponds to the difference between the integer multiple of the reference period and the display period.

17. The display device of claim 15, wherein each of the 'k' number of reference cycle sections includes:

a first non-light emitting section and a first light emitting section, and wherein the compensating cycle section includes a second non-light emitting section, a second light emitting section, and a third non-light emitting section, and wherein a duration of the third non-light emitting section corresponds to the difference between the integer multiple of the reference period and the display period.

18. An electronic device comprising:

a display panel including a plurality of pixels to emit light in response to a data signal;

a display driver circuit configured to provide the data signal to the display panel; and a main processor configured to provide an image signal to the display driving circuit, in response to an input synchronization signal, wherein the display driver circuit includes:

a driving controller configured to receive the image signal from the main processor at a variable frame rate, and output image data obtained by converting the image signal in response to a display synchronization signal; and a data driver configured to convert the image data to the data signal and output the data signal, wherein the driving controller includes:

a data converting block configured to output the image data during a present frame section determined based on the display synchronization signal; and a light emitting control block configured to compare a reference period of a reference cycle section of a light emitting cycle of the display panel, which is preset, with a display period of the present frame section, a calculating unit to calculate a difference between an integer multiple of the reference period and the display period, when the display period differs from the integer multiple of the reference period;

wherein the light emitting control block is further configured to, adjust the reference period to an adjusted period based on the difference, and output a driving control signal for controlling the display panel to emit light during an adjusted cycle section having the adjusted period from a starting time point of a next frame section, wherein the adjusted cycle section compensates for the difference between the display period and the integer multiple of the reference period.

19. The electronic device of claim 18, wherein a duty ratio of the adjusted cycle section differs from a duty ratio of the reference cycle section.

20. The electronic device of claim 18, wherein the present frame section corresponds to a 'k' number of reference cycle sections sequentially occurring and one compensating cycle section, wherein 'k' is an integer equal to or greater than '1', and wherein a duty ratio of the compensating cycle section differs from a duty ratio of each of the 'k' number of reference cycle sections.

* * * * *